United States Patent
Miyazaki et al.

(10) Patent No.: US 10,286,561 B2
(45) Date of Patent: May 14, 2019

(54) FINGER MECHANISM, ROBOT HAND AND ROBOT HAND CONTROLLING METHOD

(71) Applicant: SQUSE Inc., Kyoto-shi, Kyoto (JP)

(72) Inventors: Yoshihiro Miyazaki, Kyoto (JP); Kanami Toui, Kyoto (JP)

(73) Assignee: SQUSE Inc., Kyoto-shi, Kyoto (JP)

( * ) Notice: Subject to any disclaimer, the term of this patent is extended or adjusted under 35 U.S.C. 154(b) by 0 days.

(21) Appl. No.: 16/137,939

(22) Filed: Sep. 21, 2018

(65) Prior Publication Data
US 2019/0099899 A1  Apr. 4, 2019

(30) Foreign Application Priority Data
Oct. 2, 2017  (JP) .................................. 2017-192955

(51) Int. Cl.
  *B25J 15/10*  (2006.01)
  *B25J 15/12*  (2006.01)
  *B25J 9/00*  (2006.01)
(52) U.S. Cl.
  CPC ............. *B25J 15/10* (2013.01); *B25J 9/0015* (2013.01)
(58) Field of Classification Search
  CPC ................................ B25J 15/10; B25J 9/0015
  USPC ................. 294/111, 106; 901/25, 39, 45, 46
  See application file for complete search history.

(56) References Cited

U.S. PATENT DOCUMENTS

| 5,447,403 A | * | 9/1995 | Engler, Jr. | ........... B25J 15/0009 294/111 |
| 5,647,723 A | * | 7/1997 | Rush | ...................... B25J 9/1085 294/111 |
| 6,817,641 B1 | * | 11/2004 | Singleton, Jr. | ........... B25J 9/102 294/106 |

(Continued)

FOREIGN PATENT DOCUMENTS

| JP | 2004-042214 A | 2/2004 |
| JP | 2008-032140 A | 2/2008 |

(Continued)

*Primary Examiner* — Paul T Chin
(74) *Attorney, Agent, or Firm* — Bret E. Field; Bozicevic, Field & Francis LLP

(57) ABSTRACT

A finger mechanism includes a first bone member and a second bone member, a first rotation core that rotatably couples the first bone member and the second bone member at end portions in a direction of a length thereof, an extensor tendon that is disposed on a side where the second bone member extends with respect to the first bone member and extends in the direction of the length of the first bone member and the second bone member, a first extensor tendon guide that is provided on both of the first bone member and the second bone member and guides the extensor tendon so that the extensor tendon is in contact with a part of a surface of the first rotation core, an extensor that is connected to the extensor tendon and extends and flexes the extensor tendon, a flex tendon that is disposed on a side where the first bone member flexes with respect to the second bone member and extends in the direction of the length of the first bone member and the second bone (Continued)

member, a first flex tendon guide that is provided on both of the first bone member and the second bone member and guides the flex tendon so that the flex tendon is in contact with another part of the surface of the first rotation core, and a flexor that is connected to the flex tendon and extends and flexes the flex tendon.

33 Claims, 16 Drawing Sheets

(56) References Cited

U.S. PATENT DOCUMENTS

| | | | |
|---|---|---|---|
| 8,919,842 B2* | 12/2014 | Ihrke | B25J 9/104 |
| | | | 294/111 |
| 9,833,908 B2* | 12/2017 | Nagatsuka | B25J 15/0009 |
| 2006/0131908 A1* | 6/2006 | Tadano | B25J 9/104 |
| | | | 294/111 |
| 2007/0035143 A1* | 2/2007 | Blackwell | B25J 9/104 |
| | | | 294/111 |
| 2011/0067520 A1 | 3/2011 | Ihrke et al. | |
| 2013/0226350 A1* | 8/2013 | Bergelin | B25J 9/0006 |
| | | | 700/275 |
| 2014/0222199 A1* | 8/2014 | Ihrke | B25J 15/0009 |
| | | | 700/253 |

FOREIGN PATENT DOCUMENTS

| | | |
|---|---|---|
| JP | 2011-067936 A | 4/2011 |
| JP | 2011-245575 A | 12/2011 |
| JP | 2015-221469 A | 12/2015 |

* cited by examiner

FIG. 12

| VALVE NUMBER | I | II | III | IV | FINGER OPERATION | APPLICATION |
|---|---|---|---|---|---|---|
| VALVE FUNCTION | EXTENSOR PRESSURIZATION | EXTENSOR DEPRESSURIZATION | FLEXOR PRESSURIZATION | FLEXOR DEPRESSURIZATION | | |
| VALVE STATUS 0 | OFF | OFF | OFF | OFF | HOLDING | HOLDING OF TENDON ANTAGONISM |
| VALVE STATUS 1 | OFF | OFF | OFF | ON | | |
| VALVE STATUS 2 | OFF | OFF | ON | OFF | TIGHTENING | ADDITIONAL TIGHTENING OF OBJECT |
| VALVE STATUS 3 | OFF | OFF | ON | ON | | |
| VALVE STATUS 4 | OFF | ON | OFF | OFF | RELAXING | FINGER PULLING AFTER RELEASING, PROTECTING OF ARTIFICIAL MUSCLE AND TENDON |
| VALVE STATUS 5 | OFF | ON | OFF | ON | | |
| VALVE STATUS 6 | OFF | ON | ON | OFF | ADAPTIVE GRASPING | GRASPING OF OBJECT |
| VALVE STATUS 7 | OFF | ON | ON | ON | | |
| VALVE STATUS 8 | ON | OFF | OFF | OFF | LOOSENING | LOOSENING OF OBJECT |
| VALVE STATUS 9 | ON | OFF | OFF | ON | ADAPTIVE RELEASING | RELEASING OF OBJECT |
| VALVE STATUS 10 | ON | OFF | ON | OFF | FIXING | INITIAL FILLING OF ARTIFICIAL MUSCLE, DECREASING FLEXIBILITY OF JOINT |
| VALVE STATUS 11 | ON | OFF | ON | ON | | |
| VALVE STATUS 12 | ON | ON | OFF | OFF | | |
| VALVE STATUS 13 | ON | ON | OFF | ON | | |
| VALVE STATUS 14 | ON | ON | ON | OFF | | |
| VALVE STATUS 15 | ON | ON | ON | ON | | | ced to their extracted text.

FINGER MECHANISM, ROBOT HAND AND ROBOT HAND CONTROLLING METHOD

CROSS-REFERENCE TO RELATED APPLICATIONS

This Nonprovisional application claims priority under 35 U.S.C.§ 119(a) on Patent Application No. 2017-192955 filed in Japan on Oct. 2, 2017, the entire contents of which are hereby incorporated by reference.

FIELD

The present application relates to a finger mechanism, a robot hand and a robot hand controlling method.

BACKGROUND

In recent years, robot hands imitating a function of a human hand and industrial robots equipped with the robot hands are proposed in order to grasp an object and perform some work (for example, refer to Japanese Patent Application Laid-Open No. 2008-32140, No. 2011-245575, No. 2015-221469, No. 2011-67936, and No. 2004-42214).

However, in the conventional robot hand and the conventional industrial robot equipped with the robot hand, it was difficult to grasp and work on an indefinite soft object such as a soft object or an object whose shape is not fixed.

SUMMARY

The present application has been made in view of such circumstances, and it is an object of the present application to provide a finger mechanism, a robot hand, and a robot hand controlling method that can work by grasping the indefinite soft object such as the soft object or the object whose shape is not fixed.

According to one aspect, a finger mechanism includes a first bone member and a second bone member, a first rotation core that rotatably couples the first bone member and the second bone member at end portions in a direction of a length thereof, an extensor tendon that is disposed on a side where the second bone member extends with respect to the first bone member and extends in the direction of the length of the first bone member and the second bone member, a first extensor tendon guide that is provided on both of the first bone member and the second bone member and guides the extensor tendon so that the extensor tendon is in contact with a part of a surface of the first rotation core, an extensor that is connected to the extensor tendon and extends and flexes the extensor tendon, a flex tendon that is disposed on a side where the first bone member flexes with respect to the second bone member and extends in the direction of the length of the first bone member and the second bone member, a first flex tendon guide that is provided on both of the first bone member and the second bone member and guides the flex tendon so that the flex tendon is in contact with another part of the surface of the first rotation core, and a flexor that is connected to the flex tendon and extends and flexes the flex tendon.

According to one aspect, a robot hand includes the finger mechanism as described above, a pressurizing solenoid valve and a depressurizing solenoid valve provided midway on a supply path to supply compressed air to the Mckibben air-driven actuators that the finger mechanism is provided with, and a control unit that controls opening and closing of the pressurizing solenoid valve and the depressurizing solenoid valve, wherein the control unit controls opening and closing of the pressurizing solenoid valve and the depressurizing solenoid valve and controls degrees of contraction of the extensor and the flexor that the finger mechanism is provided with by adjusting an air pressure in the air-driven actuators.

According to one aspect, a robot hand controlling method, wherein the robot hand includes the finger mechanism as described above, a pressurizing solenoid valve and a depressurizing solenoid valve provided midway on a supply path to supply compressed air to the Mckibben air-driven actuators constituting the extensor and the flexor of the finger mechanism and a control unit that controls opening and closing of the pressurizing solenoid valve and the depressurizing solenoid valve and controls degrees of contraction of the extensor and the flexor, the method includes executing a control of opening and closing of the pressurizing solenoid valve and the depressurizing solenoid valve in order to execute the following operation by the control unit, wherein the operation includes a fixing operation to make antagonistic to each other traction forces of the extensor and the flexor that the finger mechanism is provided with before an operation to grasp an object to be grasped, an adaptive grasping operation to grasp the object to be grasped according to a shape of the object to be grasped, a holding operation to hold the grasping state, an adaptive releasing operation to release the holding operation, and a relaxing operation to relax the extensor and the flexor.

According to the present application, it is possible to grasp and work on the indefinite soft object such as the soft object and the object whose shape is not fixed.

The above and further objects and features of the invention will more fully be apparent from the following detailed description with accompanying drawings.

BRIEF DESCRIPTION OF DRAWINGS

FIG. 12 is an explanatory view explaining the control states of the solenoid valves I to IV.

DESCRIPTION OF EMBODIMENTS

Hereinafter, the present invention will be concretely described based on the drawings depicting embodiments thereof.

First Embodiment

Figure 1:
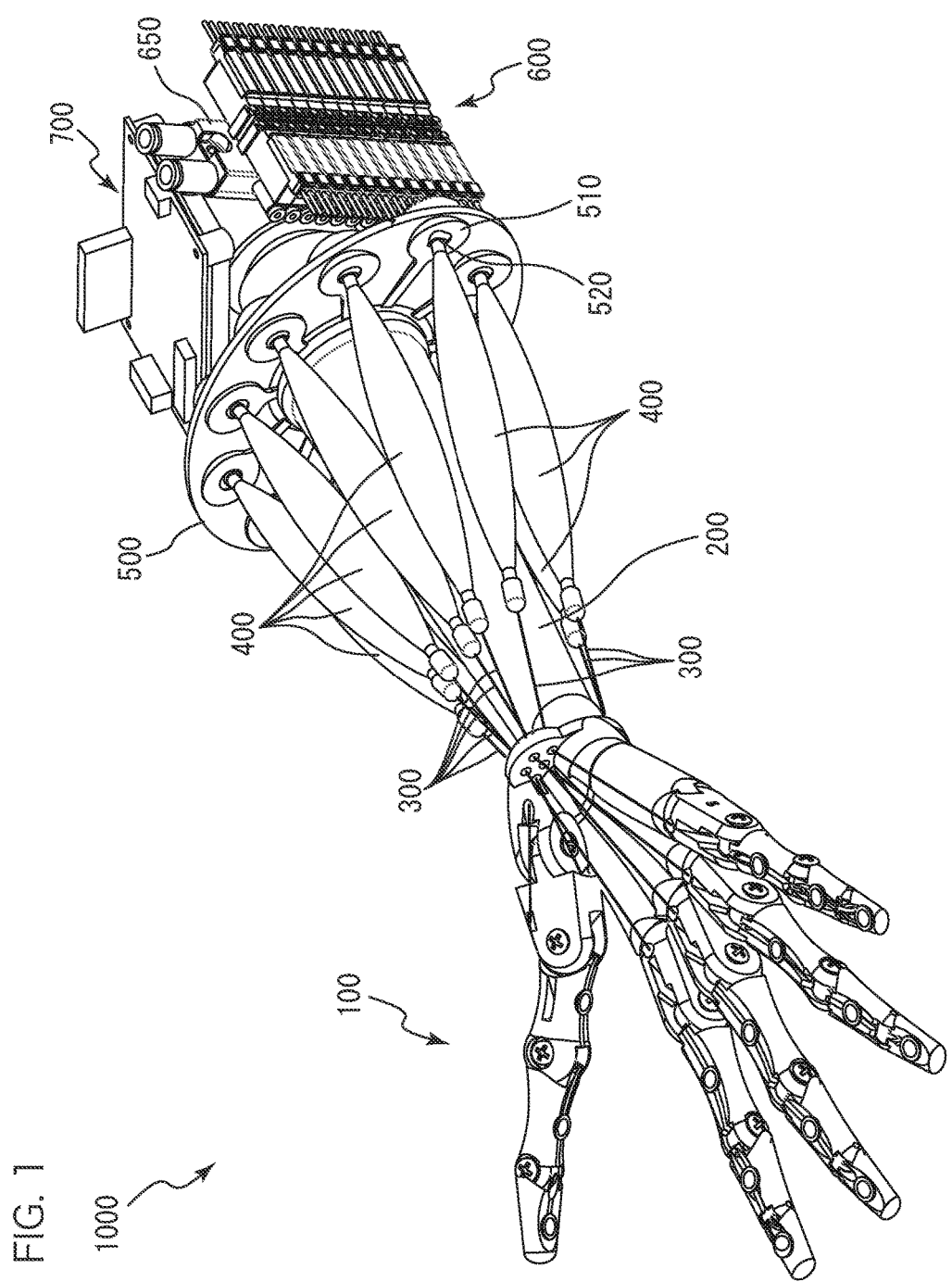
FIG. 1 is an external view depicting a schematic structure of a robot hand according to a first embodiment.

FIG. 1 is an external view depicting a schematic structure of a robot hand 1000 according to a first embodiment. The robot hand 1000 according to the present embodiment is provided with a finger mechanism portion 100, a forearm bone 200, tendons 300, artificial muscles 400, a flange 500, solenoid valves 600, and a control board 700. The fingers of the finger mechanism portion 100 are each structured so as to extend or flex according to the tension of the tendon 300 controlled so as to be extended and flexed by the artificial muscle 400. A feature of the present embodiment is that by performing antagonistic control of two kinds of tendons 300 (an extensor tendon 300A and a flex tendon 300B described later, see FIG. 4), the joint angle and the force are autonomously controlled to realize control of the grasping form, the holding force and the flexibility of finger joint (compliance control).

The artificial muscles 400 are arranged around the forearm bone 200. The forearm bone 200 which corresponds to the human forearm bone is a member corresponding to the part from the wrist joint to the arm joint. The artificial muscles 400 which are each, for example, a Mckibben air-driven actuator are supplied with air from a manifold 650 controlled by the opening and closing of the solenoid valves 600, and the contraction degrees thereof are controlled. That is, when air is supplied to the inside of the artificial muscles 400, the artificial muscles 400 flex by expanding in the direction of the width thereof and flexing in the direction of the length thereof. Conversely, when air is released from the inside of the artificial muscles 400, the artificial muscles 400 relax by flexing in the direction of the width thereof and extending in the direction of the length thereof.

The solenoid valves 600 are controlled by a CPU 701 (see FIG. 10) mounted on the control board 700. The control board 700 may be mounted with, in addition to the CPU 701, an input side connector and an output side connector used for various interfaces performing communication with the CPU 701, a coil driver that drives the coils of the solenoid valves 600, and various electronic devices such as an operational amplifier, a comparator, a transistor, a diode and a register that process various signals, voltages and currents.

The artificial muscles 400 have the distal side end portions thereof connected to the tendons 300, respectively, and have the proximal side end portions thereof connected to universal joints 520, respectively. The universal joints 520 are structured so as to freely slide within ribs 510 provided in demarcated areas of the flange 500, respectively. The tendons 300 connected to the artificial muscles 400 are extended by the artificial muscles 400 flexing, and are shortened by the artificial muscles 400 relaxing.

While Mckibben air-driven actuators are used as the artificial muscles 400 in the present embodiment, instead of the air-driven actuators, a method may be adopted in which the tendons 300 are reeled up by using a motor and a pulley. Moreover, the following methods and the like may be adopted: a method in which the tendons 300 are directly extended and flexed by using a linear motor; and a method in which the tendons 300 are extended and flexed by using a biometal which is a fibrous actuator that extends and flexes by current flowing.

Figure 2:
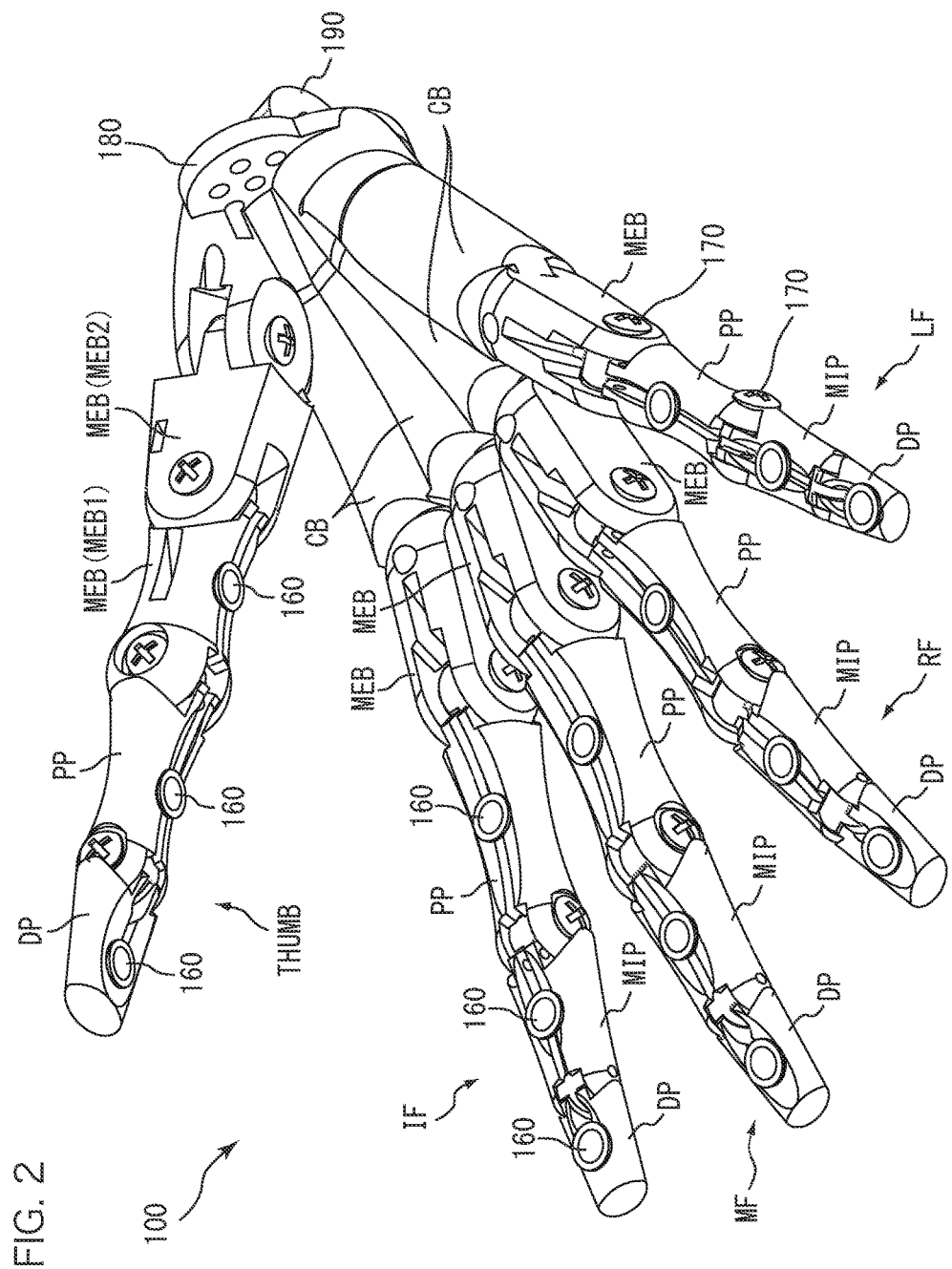
FIG. 2 is external views of the finger mechanism portion.
Figure 3:
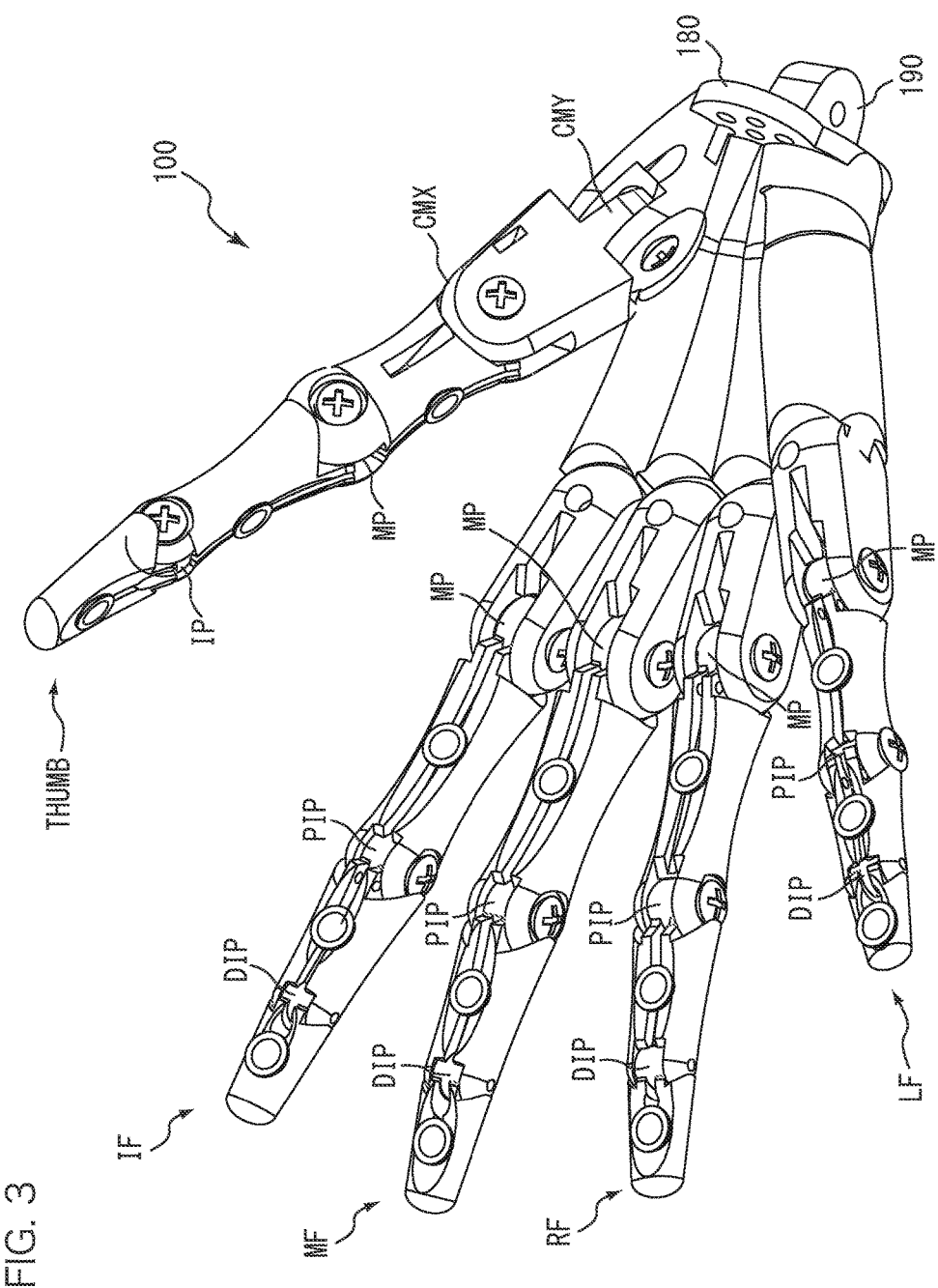
FIG. 3 is external views of the finger mechanism portion.

FIG. 2 and FIG. 3 are external views of the finger mechanism portion 100. To avoid complexity of the drawings, FIG. 2 mainly depicts the structure of the bone members, and FIG. 3 mainly depicts the structure of the joints. The finger mechanism portion 100 includes five fingers like the human body, and is formed of five fingers of a first finger THUMB (referred to also as a thumb or a hallux), a second finger IF (referred to also as an index finger), a third finger MF (referred to also as a middle finger), a fourth finger RF (referred to also as a ring finger or a medicinal finger) and a fifth finger LF (referred to also as a little finger). FIG. 2 depicts an external view viewed from the palm side of a human hand. Therefore, the front side when FIG. 2 is viewed squarely is the part that is in contact with an object to be grasped OBJ (see FIG. 9). The index finger IF, the middle finger MF, the ring finger RF and the little finger LF of the finger mechanism portion 100 other than the thumb THUMB are formed of a distal phalanx DP, a middle phalanx MIP, a proximal phalanx PP and a metacarpal bone MEB, respectively.

Figure 4:
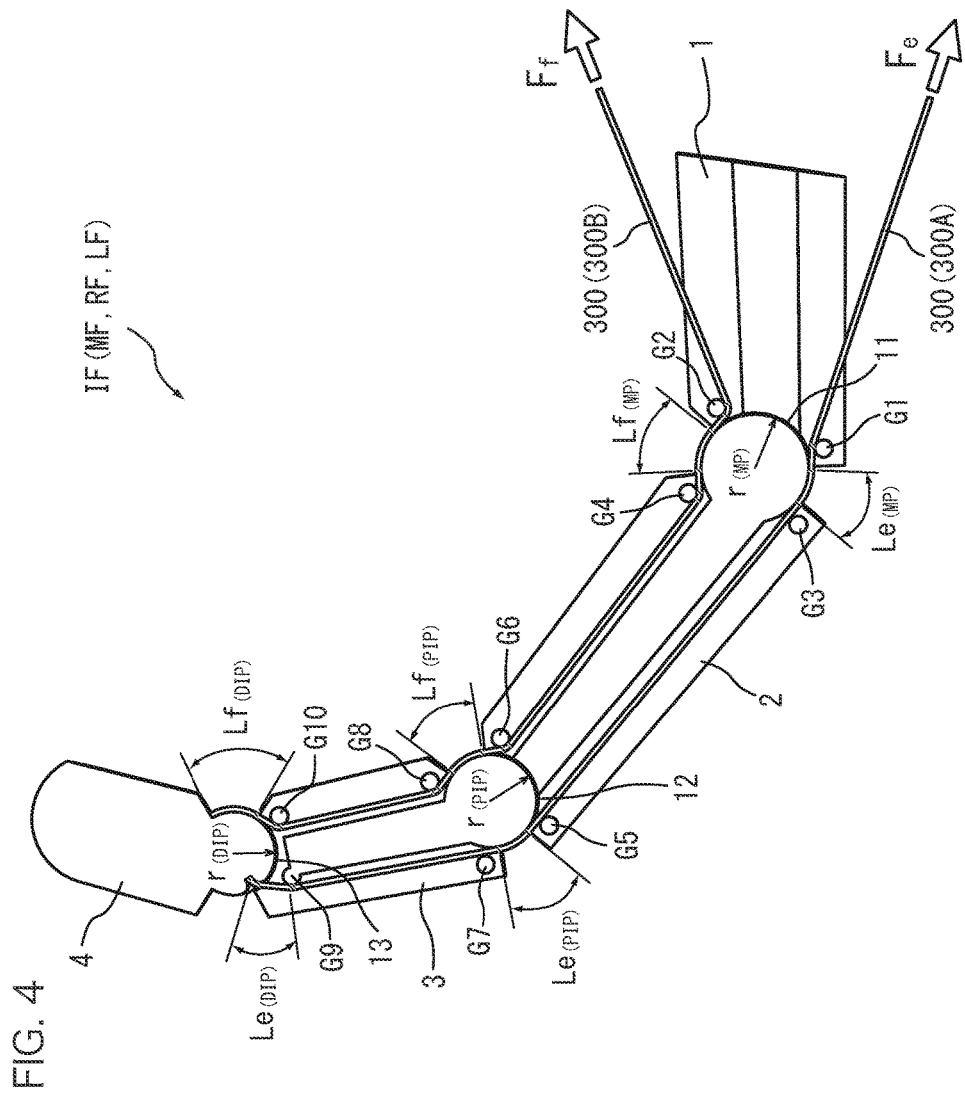
FIG. 4 is an explanatory view for explaining the operation of a tendon antagonistic joint.

Two tendons 300 are provided also to each finger (see FIG. 4). The two tendons 300 provided to each finger are the extensor tendon 300A and the flex tendon 300B described later. Each tendon 300 extends from the direction of the length of the metacarpal bone MEB, through a metacarpophalangeal joint MP and in the direction of the length of the proximal phalanx PP, further extends from the direction of the length of the proximal phalanx PP, through a proximal interphalangeal joint PIP and in the direction of the length of the middle phalanx MIP, and further extends from the direction of the length of the middle phalanx MIP, through a distal interphalangeal joint DIP and in the direction of the length of the distal phalanx DP. The distal side end portions of the two tendons 300 are fixed to the distal phalanx DP. The index finger IF, the middle finger MF, the ring finger RF and the little finger LF are integrated at the end portions of carpal bones CB, and the other end portions of the carpal bones CB are coupled to a hand joint 190 through a carpal tunnel 180. A plurality of holes are provided so as to pass through in the direction of the thickness of the carpal tunnel 180, and through these holes, a plurality of tendons 300 are directed in a predetermined direction to be fixed to one end portions of the artificial muscles 400 depicted in FIG. 1. In the present embodiment, it is not essential that the dimensions of the bone members in the direction of the length be longer than the dimensions thereof in the direction of the width, and the direction in which the tendons 300 that extend or flex the bone members are disposed will be referred to as the direction of the length.

A force sensor 160 that detects the holding force when the object to be grasped OBJ is held may be provided to the part which is, for example, at least one of the distal phalanx DP, the middle phalanx MIP, the proximal phalanx PP and the metacarpal bone MEB of each finger and that is in contact with the object to be grasped (that is, the palm side of the hand). Moreover, the joint portions may be each provided with an angle sensor 170 that detects the angle between the intercoupled members (joint angle). These force and angle sensors 160 and 170 are not essential components in the finger mechanism portion 100 of the present invention. However, when the shape and hardness of the object to be grasped OBJ are known in advance, the range of the movement of each finger can be automatically controlled by attaching such sensors.

In FIG. 3 which is completely the same as the structure of the finger mechanism portion 100 of FIG. 2, the angle of the outer appearance is changed. The parts the same as those of FIG. 2 are denoted by the same reference designations. To avoid complexity of the drawing, no reference designations are depicted at the distal phalanx DP, the middle phalanx MIP, the proximal phalanx PP, the metacarpal bone MEB and the like of each finger. FIG. 3 is prepared to depict the part of a carpometacarpal joint CM (CMX, CMY) of the thumb THUMB in further detail.

Although the thumb THUMB includes the distal phalanx DP, the proximal phalanx PP and the metacarpal bone MEB (MEB1, MEB2) like the other fingers, it does not have the middle phalanx MIP that the other fingers have. Unlike the other fingers, the metacarpal bone MEB is formed of a divided first metacarpal bone MEB1 and second metacarpal bone MEB2. With this structure, the carpometacarpal joint CM of the thumb THUMB is formed of a first carpometacarpal joint CMX and a second carpometacarpal joint CMY unlike the other carpometacarpal joints CM. The first carpometacarpal joint CMX links the first metacarpal bone MEB1 and the second metacarpal bone MEB2, and the second carpometacarpal joint CMY links the second metacarpal bone MEB2 and the carpal bone CB.

By dividing the carpometacarpal joint as the base of the thumb THUMB into two joints, the degree of freedom of the thumb THUMB increases, and in particular, since the width of the angle where it can face the little finger LF increases, the force to grasp the object is improved.

While an example of the finger mechanism portion 100 having five fingers is depicted in FIGS. 1 to 3, the number of fingers is not limited to five and is only necessarily more than one. For example, when the finger mechanism portion 100 is formed of two fingers, it is formed of the thumb THUMB and the index finger IF, and when it is formed of three fingers, the middle finger MF is further added. Further, for example, four fingers each corresponding to the index finger IF are prepared so that a plurality of fingers are formed of the same fingers.

FIG. 4 is an explanatory view for explaining the operation of a tendon antagonistic joint. As a term similar to the term tendon antagonistic joint, what is called antagonistic tendon driving is known. It can be said that these are substantially the same in that two tendons, an extensor tendon and a flex tendon, are made antagonistic to each other. However, the tendon antagonistic joint is different in that importance is placed on the structure of the joint suitable for executing the antagonistic tendon driving. In other words, it can also be said that the tendon antagonistic joint according to the present embodiment is a joint having a suitable structure where the largeness of the rotation of the joint can be uniquely determined by the tendons being antagonistic to each other. The tendon antagonistic joint and the basic operation thereof depicted in FIG. 4 are commonly applied to the joints of the thumb THUMB, the index finger IF, the middle finger MF, the ring finger RF and the little finger LF depicted in FIGS. 2 and 3.

As depicted in FIG. 4, the finger mechanism portion 100 is provided with a first bone member 1, a second bone member 2, a third bone member 3 and a fourth bone member 4. These bone members are made of, for example, acrylonitrile-butadiene-styrene copolymerized resin (ABS). At the distal side end portion of the first bone member 1, tendon guides G1 and G2 are provided. The first bone member 1 and the second bone member 2 are rotatably coupled by a rotation core 11, the second bone member 2 and the third bone member 3, by a rotation core 12, and the third bone member 3 and the fourth bone member 4, by a rotation core 13. The rotation cores 11 to 13 correspond to the joints of the present invention, respectively. At the proximal side end portion of the second bone member 2, tendon guides G3 and G4 are provided, and at the distal side end portion thereof, tendon guides G5 and G6 are provided. At the proximal side end portion of the third bone member 3, tendon guides G7 and G8 are provided, and at the distal side end portion thereof, tendon guides G9 and G10 are provided. The tendon guides G1 to G10 may be made of, for example, the same material as that of the first to fourth bone materials 1 to 4, or PE (polyethylene), PA (polyamide) or the like.

FIG. 4 depicts a condition where the extensor tendon 300A and the flex tendon 300B are guided by the tendon guides G1 to G10 to be in contact with the rotation cores 11 to 13. The rotation core 11 has a curved surface portion the cross-sectional shape of which is partly circular, and is formed integrally with the second bone member 2. Moreover, the rotation core 12 has a curved surface portion the cross-sectional shape of which is partly circular, and is formed integrally with the third bone member 3. Further, the rotation core 13 has a curved surface portion the cross-sectional shape of which is partly circular, and is formed integrally with the fourth bone member 4.

While the rotation cores 11 to 13 are formed integrally with any of the second to fourth bone materials 2 to 4 in the example of FIG. 4, they may be provided separately from the first to fourth bone materials 1 to 4. Moreover, the shape of the rotation cores 11 to 13 is not limited to a circle but may be an oval. It is needless to say that the shape may be a combination of a circle and an oval. In any case, the shape of the rotation cores 11 to 13 is not limited as long as an arc-shaped portion is provided on part of the surface of the rotation cores 11 to 13 and the contact length of the rotation cores 11 to 13 with the extensor tendon 300A and the flex tendon 300B is changed by the workings of the tendon guides G1 to G10.

FIG. 4 depicts a condition where the extensor tendon 300A and the flex tendon 300B extend from the proximal side toward the distal side, that is, from the first bone member 1 toward the fourth bone member 4 while being in contact with the curved surface portions of the rotation cores 11 to 14. The extensor tendon 300A is disposed on the back side of a human hand, whereas the flex tendon 300B is disposed on the palm side of a human hand. One end of the extensor tendon 300A is connected to an artificial muscle 400A (see FIG. 5, hereinafter, referred to also as extensor 400A) which is one of the artificial muscles 400 that the finger mechanism portion 100 is provided with. There is a concern that the portion where the other end of the extensor tendon 300A and the fourth bone member 4 are fixed to each other receives tensile stress so that the mechanical strength thereof is deteriorated. To avoid this trouble, these are not completely fixed and in order that stress can be relieved, for example, the extensor tendon 300A is attached by being tied to part of the fourth bone member 4.

One end of the flex tendon 300B is connected to an artificial muscle 400B (see FIG. 5, hereinafter, referred to also as flexor 400B) which is an artificial muscle 400 other than the artificial muscle 400A to which the extensor tendon 300A is connected. Like the case of the extensor tendon 300A, there is a concern that the portion where the other end of the flex tendon 300B and the fourth bone member 4 are fixed to each other receives tensile stress so that the mechanical strength thereof is deteriorated. To avoid this trouble, these are not completely fixed and in order that stress can be relieved, for example, the flex tendon 300B is attached by being tied to part of the fourth bone member 4.

The tendons 300 which are elastic bodies are extended by the traction force Fe of the extensor and the traction force Ff of the flexor, and cause an internal tension according to the extended amount. Using the cross-sectional area A of the tendons 300, the distortion e of the tendons 300 and the Young's modulus E of the tendons 300, the internal tension that resists the traction forces Fe and Ff is given by A×E×e. Here, the distortion e of the tendons 300 is given by E=ΔL/L0 from the free length L0 and the extended amount ΔL of the tendons 300.

When the traction force of the extensor is Fe and the traction force of the flexor is Ff, the extended amounts $Lf_{(DIP)}$, $LF_{(PIP)}$ and $Lf_{(MP)}$ of the flex tendon 300B and the extended amounts $Le_{(DIP)}$, $Le_{(PIP)}$ and $Le_{(MP)}$ of the extensor tendon 300A are obtained by $$Fe=A\times E\times (Lf_{(MP)}+Lf_{(PIP)}+Lf_{(DIP)})/Lf0, \text{ and}$$

$$Ff=A\times E\times (Le_{(MP)}+Le_{(PIP)}+Le_{(DIP)})/Le0.$$

Here, it is assumed that the cross-sectional area A and the Young's modulus E are the same between the extensor tendon 300A and the flex tendon 300B. Moreover, the free length of the extensor tendon 300A is Le0 and the free length of the flex tendon 300B is Lf0. The above two expressions indicate that the traction force of the extensor 400A and the internal tension of the flex tendon 300B are equal to each other and the traction force of the flexor 400B and the internal tension of the extensor tendon 300A are equal to each other.

In the present embodiment, the radii (diameters) of the rotation cores 11 to 13 are gradually increased from the distal side toward the proximal side (hereinafter, referred to as rotation inclination). That is, the radius (diameter) is larger in the order of the rotation core 13, the rotation core 12 and the rotation core 11. It is preferable that the proportion of the rotation inclination be 10% to 40%. In particular, the ratio among the radii of the rotation cores 11 to 13 ($r_{(MP)}:r_{(PIP)}:r_{(DIP)}$) is set to 1.62:1.27:1. By providing such a rotation inclination, the order of rotation is such that after the rotation of the metacarpophalangeal joint MP is completed, the proximal interphalangeal joint PIP starts to rotate and after the rotation of the proximal interphalangeal joint PIP is completed, the distal interphalangeal joint DIP starts to rotate. When this is applied to the grasping of the object to be grasped OBJ, in a case where the rotation of the metacarpophalangeal joint MP is restricted by the proximal phalanx PP coming into contact with the object to be grasped OBJ first, the proximal interphalangeal joint PIP rotates, and the middle phalanx MIP comes into contact with the object to be grasped OBJ. Thereafter, the distal interphalangeal joint DIP rotates, and the distal phalanx DP comes into contact with the object to be grasped OBJ. Here, the contact length between the rotation cores 11 to 13 and the tendons 300 is directly obtained by the rotation radius and rotation angle at each joint. For example, the contact length $Lf_{(MP)}$ of the flex tendon 300B at the metacarpophalangeal joint MP is obtained by the rotation radius $r_{(MP)}\times$the rotation angle. The same applies to the lengths of contact with the other joints and the lengths of contact between the extensor tendon 300A and the joints.

Figure 5:
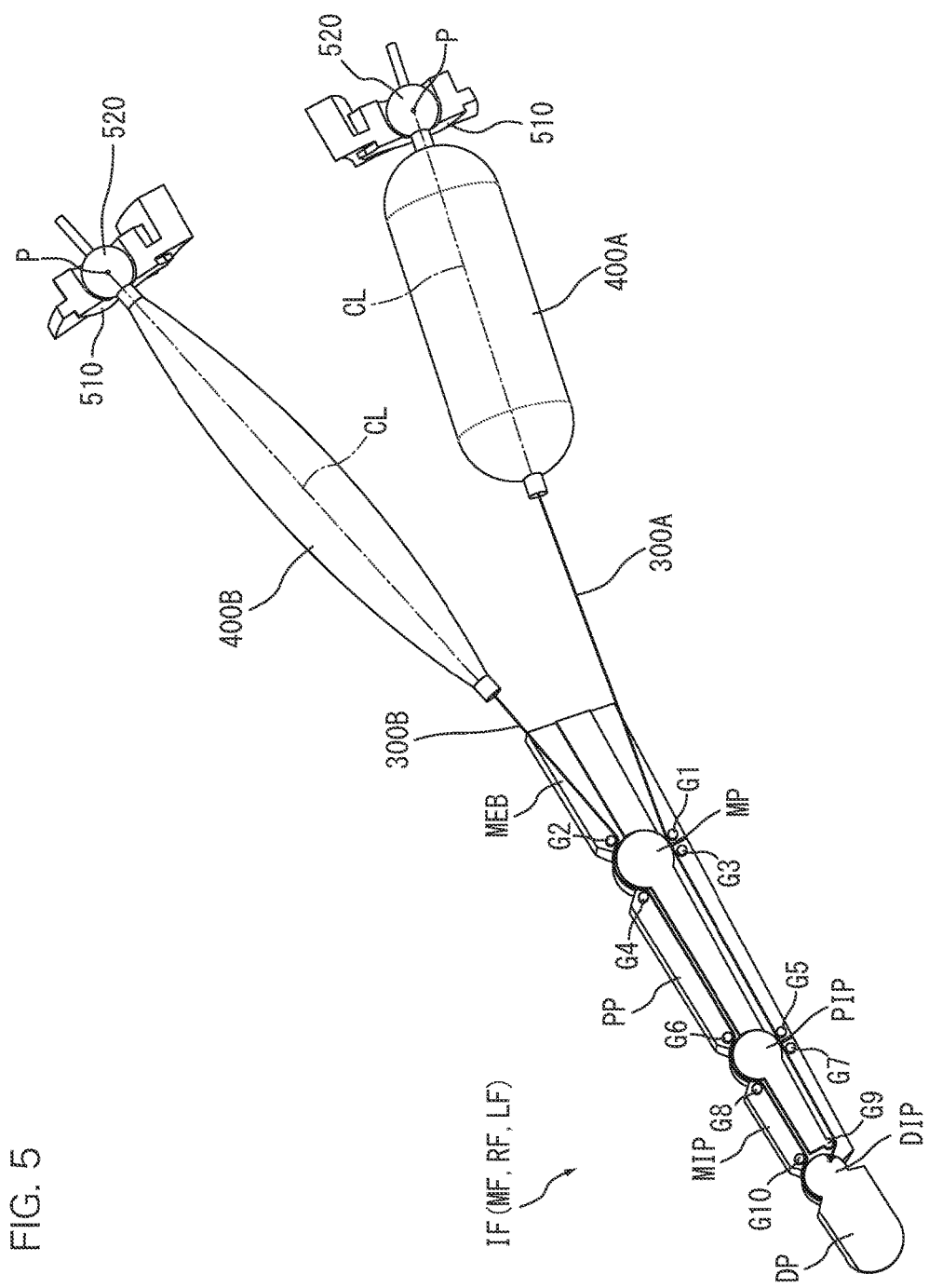
FIG. 5 is a schematic explanatory view explaining a condition where a finger is extended.

FIG. 5 is a schematic explanatory view explaining a condition where a finger is extended. FIG. 5 depicts a condition where the direction of the width of the artificial muscle 400A is expanded most and the artificial muscle 400B is relaxed most. Such a condition is a condition where the extensor tendon 300A is extended most, the flex tendon 300B is relaxed most, and the distal phalanx DP, the middle phalanx MIP, the proximal phalanx PP and the metacarpal bone MEB are situated substantially in a line. Explaining this condition by using FIG. 4, the extended amounts $Lf_{(DIP)}$, $Lf_{(PIP)}$ and $Lf_{(MP)}$ of the flex tendon 300B are maximum and the extended amounts $Le_{(DIP)}$, $Le_{(PIP)}$ and $Le_{(MP)}$ of the extensor tendon 300A are minimum. When the traction force of the extensor tendon 300A is Fe and the traction force of the flex tendon 300B is Ff, they are obtained by:

$$Fe=A\times E\times (Lf_{(MP)}+Lf_{(PIP)}+Lf_{(DIP)})/Lf0, \text{ and}$$

$$Ff=A\times E\times (Le_{(MP)}+Le_{(PIP)}+Le_{(DIP)})/Le0\approx 0.$$

Here, it is assumed that the cross-sectional area A and the Young's modulus E are the same between the extensor tendon 300A and the flex tendon 300B. Moreover, the free length of the extensor tendon 300A is Le0 and the free length of the flex tendon 300B is Lf0.

Figure 6:
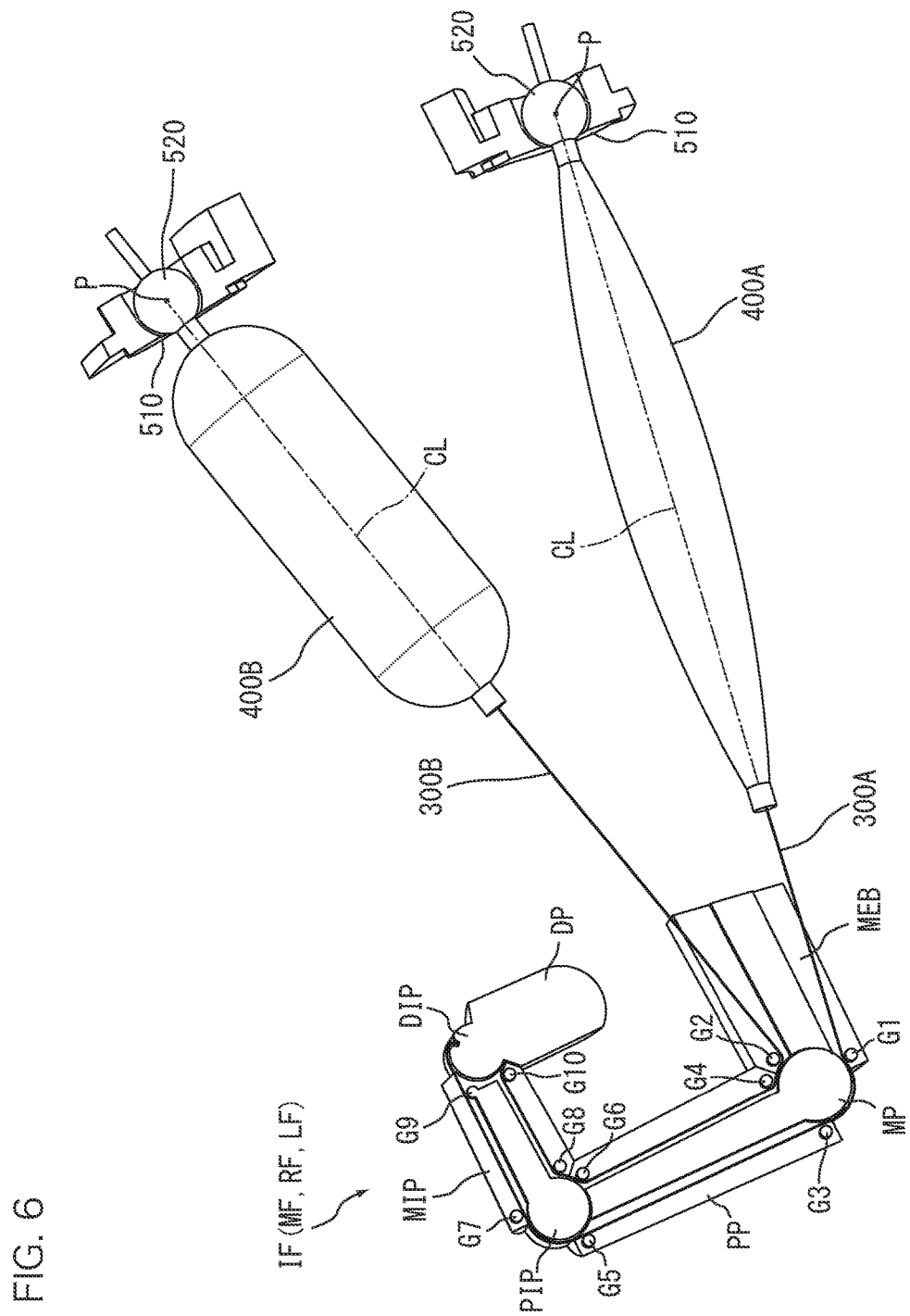
FIG. 6 is a schematic explanatory view depicting a condition where a finger is bent.

FIG. 6 is a schematic explanatory view depicting a condition where a finger is bent. FIG. 6 depicts a condition where the direction of the width of the artificial muscle 400B is expanded most and the artificial muscle 400A is relaxed most. Such a condition is a condition where the flex tendon 300B is bent most, the extensor tendon 300A is relaxed most, and the adjoining bones of the distal phalanx DP, the middle phalanx MIP, the proximal phalanx PP and the metacarpal bone MEB are arranged at angles of, for example, 60 to 90 degrees. Explaining this condition by using FIG. 4, in the condition of FIG. 6, the extended amounts $Lf_{(DIP)}$, $Lf_{(PIP)}$ and $Lf_{(MP)}$ of the flex tendon 300B are minimum and the extended amounts $Le_{(DIP)}$, $Le_{(PIP)}$ and $Le_{(MP)}$ of the extensor tendon 300A are maximum. When the traction force of the extensor tendon 300A is Fe and the traction force of the flex tendon 300B is Ff, they are obtained by:

$$Fe=A\times E\times (Lf_{(MP)}+Lf_{(PIP)}+Lf_{(DIP)})/Lf0\approx 0, \text{ and}$$

$$Ff=A\times E\times (Le_{(MP)}+Le_{(PIP)}+Le_{(DIP)})/Le0.$$

Here, it is assumed that the cross-sectional area A and the Young's modulus E are the same between the extensor tendon 300A and the flex tendon 300B. Moreover, the free length of the extensor tendon 300A is Le0 and the free length of the flex tendon 300B is Lf0.

As depicted in FIGS. 5 and 6, at the end portions of the artificial muscles 400A and 400B, the rounded universal joints 520 are provided. This is in order that irrespective of the degree of expansion (degree of contraction) of the artificial muscles 400A and 400B, the line segments connecting the extensor tendon 300A and the flex tendon 330B, and the centers P of the universal joints 520 to which they are connected coincide on the center lines CL of the artificial muscles 400A and 400B in the direction of the width. With this structure, the movements of the artificial muscles 400A and 400B are made smooth, and the loads applied on the extensor tendon 300A and the flex tendon 300B, and the artificial muscles 400A and 400B are relieved.

Figure 7:
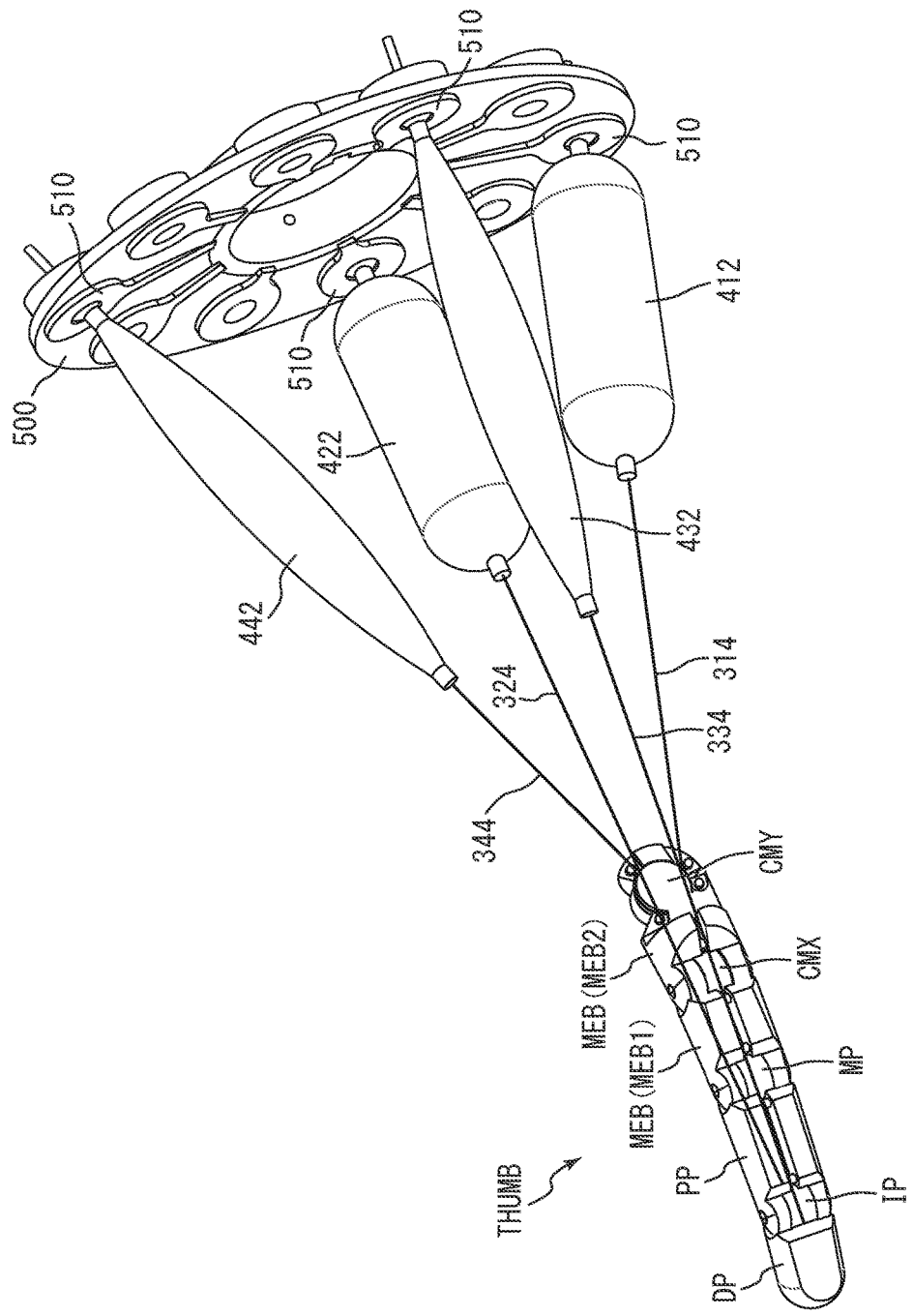
FIG. 7 depicts the mechanism of the thumb.

FIG. 7 depicts the mechanism of the thumb THUMB. Unlike the mechanisms of the other four fingers, the thumb THUMB is provided with four tendons 314, 324, 334 and 344 and four artificial muscles 412, 422, 432 and 442 that individually drive them, respectively.

The thumb THUMB is provided with the distal phalanx DP, the proximal phalanx PP and the metacarpal bone MEB, the first carpometacarpal joint CMX is provided in the middle portion of the metacarpal bone MEB, and the metacarpal bone MEB is divided into the first metacarpal bone MEB1 and the second metacarpal bone MEB2. The distal phalanx DP and the proximal phalanx PP are rotatably coupled through an interphalangeal joint IP; the proximal phalanx PP and the first metacarpal bone MEB1, through the metacarpophalangeal joint MP; the first metacarpal bone MEB1 and the second metacarpal bone MEB2, through the first carpometacarpal joint CMX; and the second metacarpal bone MEB2 and the carpal bone CB, through the second carpometacarpal joint CMY.

The interphalangeal joint IP, the metacarpophalangeal joint MP and the first carpometacarpal joint CMX provided to the thumb THUMB are rotated by the tensions of the tendons 324 and 334. The tendons 324 and 334 are provided with the tensions by the expansion and contraction of the artificial muscles 422 and 432, respectively. The tendon 324 acts as a so-called extensor tendon that extends the thumb THUMB, and the tendon 334 acts as a so-called flex tendon that flexes the thumb THUMB. The tendons 324 and 334 are not involved in the rotation of the second carpometacarpal joint CMY. In the following, the tendon 324 will be referred to also as extensor tendon 324 and the tendon 334, also as flex tendon 334.

The second carpometacarpal joint CMY provided to the thumb THUMB is rotated by the tensions of the tendons 314 and 344 unlike the other joints. The tendons 314 and 344 are provided with the tensions by the expansion and contraction of the artificial muscles 412 and 442, respectively. The tendon 344 controls the operation of the adductor of the thumb THUMB. The adductor is a muscle that pulls the thumb THUMB toward the little finger LF. Controlling the facing distances and relative distances between the thumb THUMB and the other fingers in response to the size and shape of the object to be grasped OBJ provides stability and appropriate holding strength to the grasping of the object to be grasped OBJ. The tendon 314 acts conversely to the tendon 344. That is, it controls the movement of the abductor that makes the position of the thumb THUMB further away from the side of the little finger LF. This provides swiftness and safety of the separation operation in response to the size and shape of the object to be grasped OBJ. In the following, the tendon 314 will be referred to also as abductor tendon 314 and the tendon 344, also as adductor tendon 344.

The extension and contraction of the artificial muscles 412, 422, 432 and 442 are controlled by the pressurization and depressurization of the air supplied from the side of the manifold 650 driven by the solenoid valves 600 depicted in FIG. 1, etc. The air is supplied from air supply nozzles/suction nozzles 530 (see FIG. 11) provided at one end sides of the artificial muscles 412, 422, 432 and 442 attached to the side of the flange 500 and a rib 510, respectively.

Figure 8:
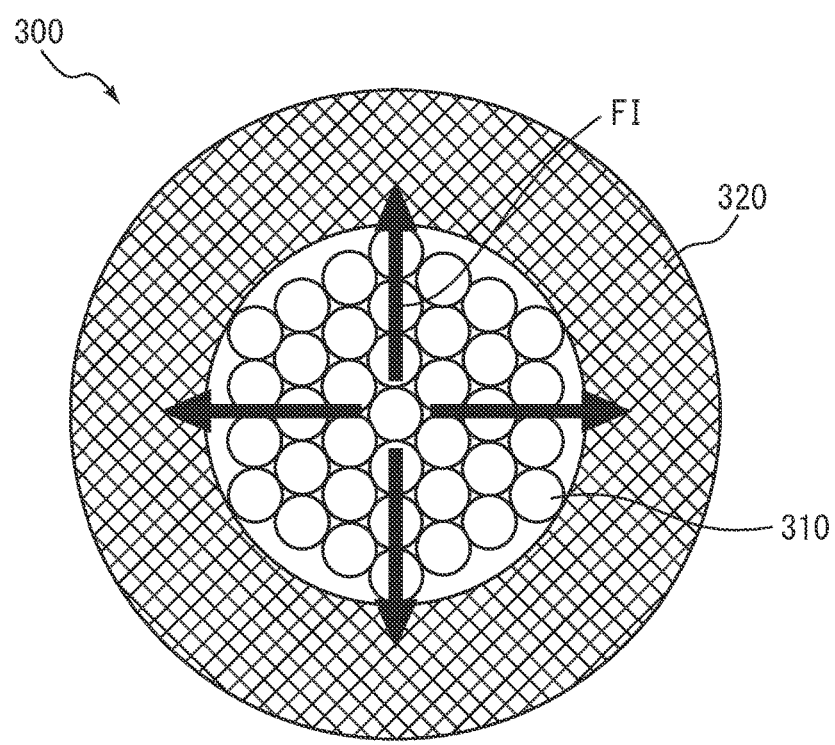
FIG. 8 is a cross-sectional view of the tendons.

FIG. 8 is a cross-sectional view of the tendons 300. The tendons 300 have a composite structure formed of a core portion 310 that is elastically deformed by the traction force of the artificial muscle 400 and a sheath portion 320 that protects the core portion 310. For the core portion 310, a synthetic resin fiber such as nylon or polyethylene the Young's modulus of which is, for example, 0.5 GPa to 2 GPa is used. The core portion 310 converts an internal tension FI to a force that acts on the tendon antagonistic joint.

The sheath portion 320 may be made of the same material as the core portion 310. The sheath portion 320 where a resin composition such as vinyl is woven into a cylindrical shape can be extended with a smaller force than the core portion 310. The function of the sheath portion 320 is to prevent the core portion 310 from being in contact with members such as the rotation cores 11 to 13 and the tendon guides G1 to G10 and prevent loss of the traction force due to friction or the like and abrasion with the core portion 310.

Figure 9:
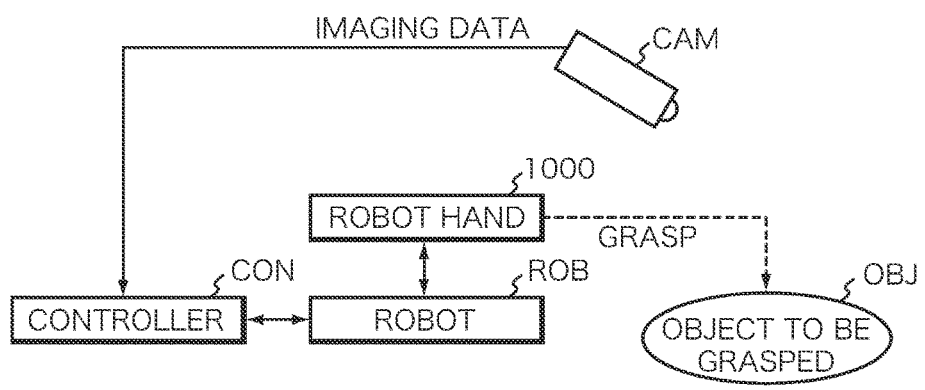
FIG. 9 is a block diagram explaining the general structure of a robot hand system according to the first embodiment.

FIG. 9 is a block diagram explaining the general structure of a robot hand system according to the first embodiment. The robot hand system according to the first embodiment is provided with the above-described robot hand 1000, a robot ROB mounted with the robot hand 1000, a controller CON that provides the robot ROB with various instructions, and an imaging device CAM that images the surrounding environment including the object to be grasped OBJ.

The controller CON which is a so-called computer device includes an input interface that accepts various pieces of information, a processing circuit that performs various kinds of arithmetic processing and information processing based on the information accepted through the input interface, and an output interface that outputs the information generated by the processing circuit to the outside (these are not depicted). The controller CON accepts, for example, an input of a P&P condition (pick and place condition) which is a control condition for the grasping and placement related to the object to be grasped OBJ. The P&P condition can be appropriately set by the user who operates or manages the robot hand 1000 according to the object to be grasped OBJ. The object to be grasped OBJ is an arbitrary object. For example, it may be a soft object such as a fruit/vegetable such as a peach or a tomato or foodstuff such as a croquette or a piece of fried chicken. Moreover, it may be an object having an indefinite shape such as a salad or a side dish. Moreover, the object to be grasped OBJ may be a comparatively small object such as a toy. The P&P condition may include a condition such as the weight, shape, softness, color, luster or the like of the object to be grasped OBJ.

The robot ROB which is, for example, N-JIKU (the applicant's trademark) is connected to the controller CON and mounted with the robot hand 1000. To the robot ROB, various conditions including the above-mentioned P&P condition are inputted through the controller CON. The robot ROB provides the robot hand 1000 with various pieces of data and various operation instructions according to the object to be grasped OBJ such as the joint angle and the grasping force based on the various conditions inputted through the controller CON.

When an operation instruction related to the grasping of the object to be grasped OBJ is accepted, the robot hand 1000 enters the operation to grasp the object to be grasped OBJ. In the grasping operation, there are cases where information on the surrounding environment of the place where the object to be grasped OBJ is placed is required. The controller CON is capable of obtaining information on the surrounding environment of the place where the object to be grasped OBJ is placed, for example, by obtaining the imaging data of the surrounding environment where the object to be grasped OBJ is placed from the imaging device CAM and analyzing the obtained imaging data. Moreover, the controller CON may obtain the three-dimensional information on the object to be grasped OBJ to determine the grasping position, the grasping posture and the like by analyzing the imaging data obtained from the imaging device CAM. The controller CON provides an operation instruction conforming to the object to be grasped OBJ based on the information related to the surrounding environment of the object to be grasped OBJ and the three-dimensional information obtained by analyzing the inputted P&P condition and imaging data. The robot hand 1000 performs autonomous control of the joint angle and the force at the finger mechanism portion 100 based on the operation instruction supplied from the controller CON, thereby realizing control (compliance control) of the grasping form, the holding force, the flexibility of finger joint and the like.

When it is possible to previously provide the controller CON with the information related to the surrounding environment of the object to be grasped OBJ, since the imaging data from the imaging device CAM is unnecessary, it is not necessary that the robot hand system include the imaging device CAM.

Figure 10:
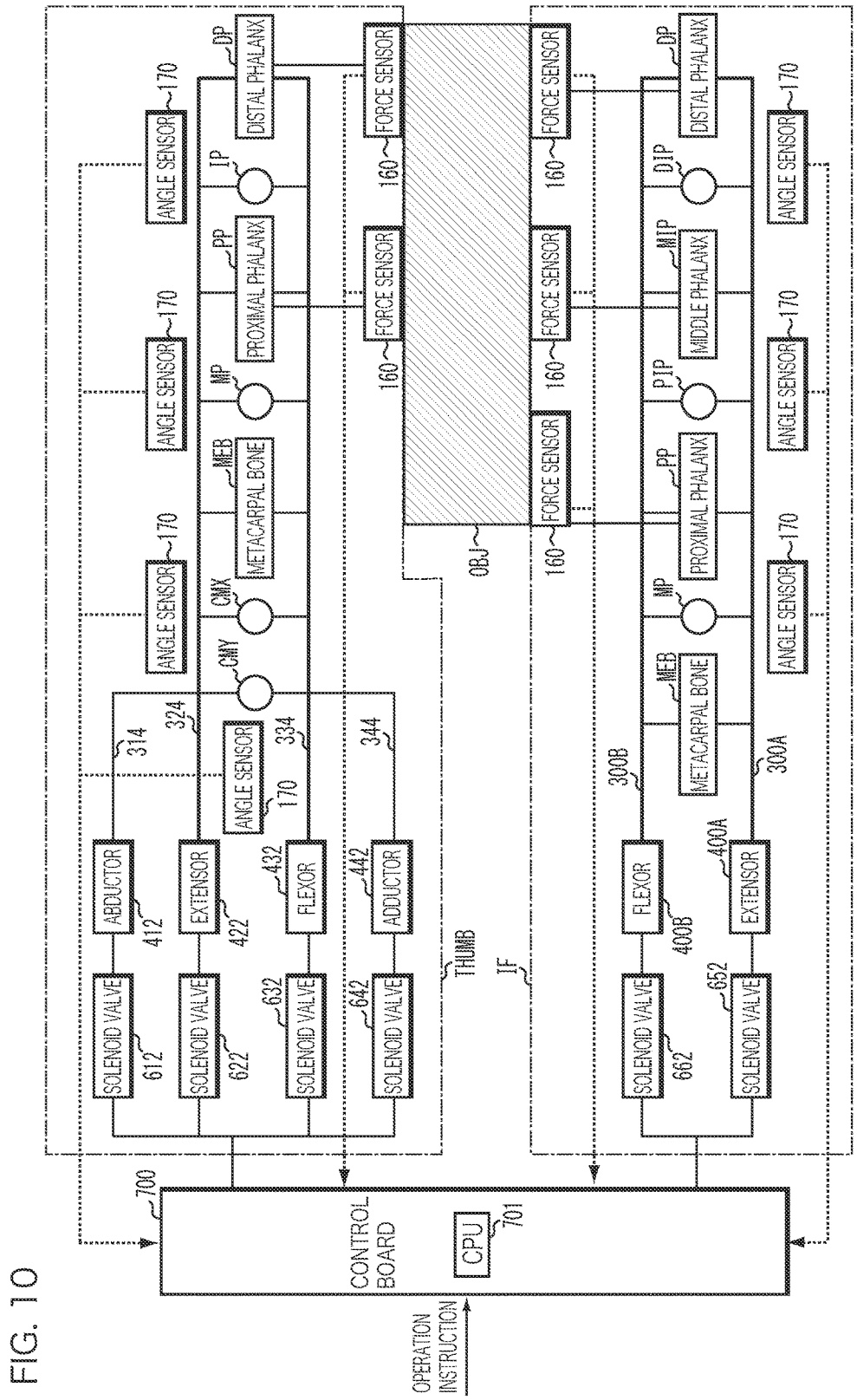
FIG. 10 is a block diagram explaining the structure of a control system of the robot hand.

FIG. 10 is a block diagram explaining the structure of a control system of the robot hand 1000. FIG. 10 depicts the connection among the joints, artificial muscles and tendons of the finger mechanisms and the solenoid valves constituting the robot hand 1000. While a condition where only the thumb THUMB and the index finger IF are facing the object to be grasped OBJ is depicted in FIG. 10 for the convenience of drawing, the middle finger MF, the ring finger RF and the little finger LF have the same joints as the index finger IF and are in contact with or face the object to be grasped OBJ as well.

The thumb THUMB includes the distal phalanx DP, the proximal phalanx PP and the metacarpal bone MEB. To the distal phalanx DP, the force sensor 160 is attached, and to the proximal phalanx PP, another force sensor 160 is attached. The force sensor 160 detects the contact force that the thumb THUMB provides to the object to be grasped OBJ. Further, as is apparent from the description given above, the bones are rotatably coupled together through the interphalangeal joint IP, the metacarpophalangeal joint MP, the first carpometacarpal joint CMX and the second carpometacarpal joint CMY. To each of the interphalangeal joint IP, the metacarpophalangeal joint MP, the first carpometacarpal joint CMX and the second carpometacarpal joint CMY, the angle sensor 170 is attached. The angle sensor 170 detects the joint angle, that is, the angle of the relative inclination between the bones, and outputs it to the CPU 701.

The basic control of the thumb THUMB is performed by providing various operation instructions to the control board 700 that controls the entire robot hand 1000 and the CPU 701 mounted thereon. The operation instructions may be provided, for example, by the controller CON depicted in FIG. 9.

When, for example, a grasp instruction for grasping the object to be grasped OBJ is inputted to the CPU 701 mounted on the control board 700 through external input means such as the controller CON, the CPU 701 transmits control signals to flex and extend the fingers to solenoid valves 612, 622, 632 and 642. The solenoid valves 612, 622, 632 and 642 having received the control signals perform supply and exhaust control so that the artificial muscles 400 (specifically, the abductor 412, the extensor 422, the flexor 432 and the adductor 442) extend and flex. The supply and exhaust control is pressurization processing to supply air to the inside of the artificial muscles 400 (412, 422, 432, 442) or depressurization processing for exhausting air therefrom.

By the extension and contraction of the artificial muscles 400 (412, 422, 432 and 442), traction forces to pull the tendons 314, 324, 334 and 344 are caused, whereby tensions occur on the tendons 314, 324, 334 and 344 (see FIG. 7).

The tensions acting on the abductor tendon 314 and the adductor tendon 344 control the second carpometacarpal joint CMY. Although also mentioned in the description of FIG. 7, the second carpometacarpal joint CMY provided to the thumb THUMB is not provided to the other fingers.

The tension acting on the extensor tendon 324 acts as the moment that rotates the joints other than the second carpometacarpal joint CMY. Therefore, this tension acts as the moment that rotates the interphalangeal joint IP, the metacarpophalangeal joint MP and the first carpometacarpal joint CMX.

The tension 33 acting on the flex tendon 334 acts as the moment that rotates the joints other than the second carpometacarpal joint CMY. Therefore, this tension acts as the moment that rotates the interphalangeal joint IP, the metacarpophalangeal joint MP and the first carpometacarpal joint CMX.

The rotation control of each joint of the thumb THUMB has been described above. Although mentioned also in FIG. 7, a feature of the thumb THUMB is that the abductor tendon 314 controlling the movement of the abductor and the adductor tendon 344 controlling the movement of the adductor are added in addition to the tendons 300 provided to the other fingers so that the movement range of the thumb THUMB is larger than before.

Next, the structure of the index finger IF will be described. The index finger IF includes the distal phalanx DP, the middle phalanx MIP, the proximal phalanx PP and the metacarpal bone MEB. To the distal phalanx DP, the middle phalanx MIP and the proximal phalanx PP, the force sensor 160 is attached. The force sensor 160 detects the contact force that the index finger IF provides to the object to be grasped OBJ. As is apparent from the description given above, the bones are rotatably coupled together through the distal interphalangeal joint DIP, the proximal interphalangeal joint PIP and the metacarpophalangeal joint MP. To each of the distal interphalangeal joint DIP, the proximal interphalangeal joint PIP and the metacarpophalangeal joint MP, the angle sensor 170 is attached. The angle sensor 170 detects the joint angle, that is, the angle of the relative inclination between the bones, and outputs it to the CPU 701.

The basic control of the index finger IF is performed, like that of the thumb THUMB, by providing various operation instructions to the CPU 701 mounted on the control board 700 of the robot hand 1000. The operation instructions may be provided, for example, by the controller CON depicted in FIG. 9.

When, for example, a grasp instruction for grasping the object to be grasped OBJ is inputted through external input means such as the controller CON, the CPU 701 transmits control signals to flex and extend the fingers to solenoid valves 652 and 662. The solenoid valves 652 and 662 having received the control signals perform supply and exhaust control so that the artificial muscles 400 (specifically, the extensor 400A and the flexor 400B) extend and flex. The supply and exhaust control is, specifically, pressurization processing to supply air to the inside of the artificial muscles 400 (400A, 400B) or depressurization processing for exhausting air therefrom.

By the extension and contraction of the artificial muscles 400 (400A, 400B), traction forces to pull the extensor tendon 300A and the flex tendon 300B are caused, whereby tensions occur on the extensor tendon 300A and the flex tendon 300B. These tensions become the moments that rotate the joints. That is, the tensions acting on the extensor tendon 300A and the flex tendon 300B act as the moments that rotate the distal interphalangeal joint DIP, the proximal interphalangeal joint PIP and the metacarpophalangeal joint MP.

The force sensor 160 attached to each of the thumb THUMB, the index finger IF, the middle finger MF, the ring finger RF and the little finger LF outputs the sensor value related to the contact force to the CPU 701. Moreover, the angle sensor 170 attached to each joint of each finger outputs the sensor value related to the joint angle of each joint to the CPU 701. These sensor values may be outputted to the controller CON through the control board 700. The user of the robot hand 1000 may determine whether to maintain, or change or modify the current status of the P&P condition based on the sensor values of the force sensor 160 and the angle sensor 170.

The operations and controls of the robot hand 1000 and the finger mechanism portion 100 described above are to feed back the grasping forces and the joint angles and successively adjust and control the control conditions in accordance with the size, shape, softness and the like of the object to be grasped OBJ, and this is the compliance control of the robot hand.

Figure 11:
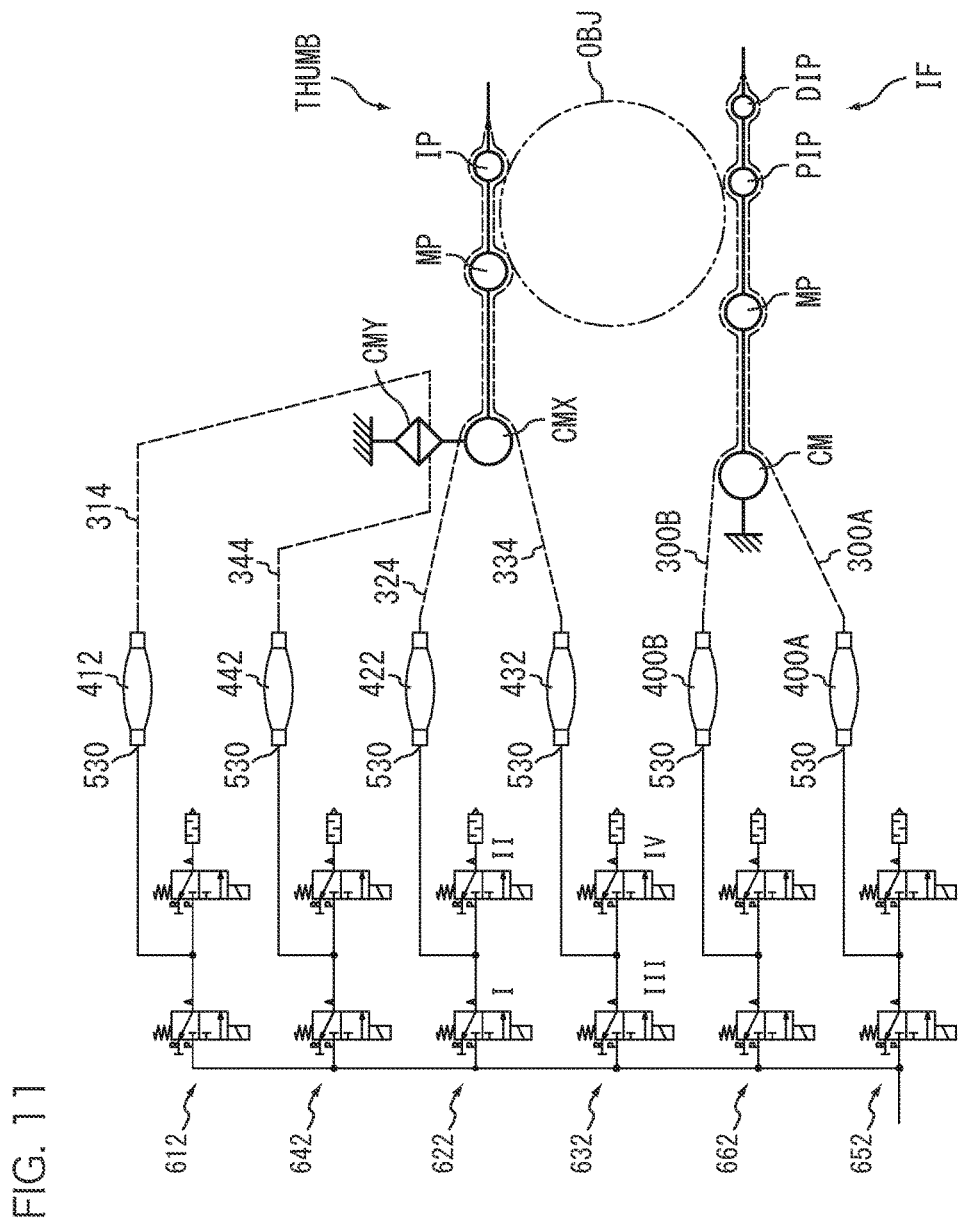
FIG. 11 is an explanatory view explaining a traction force transmitting mechanism in the finger mechanism portion.

FIG. 11 is an explanatory view explaining a traction force transmitting mechanism in the finger mechanism portion 100. FIG. 11 depicts the connection among the joints, artificial muscles and tendons of the finger mechanism portion 100 and the solenoid valves, and depicts a condition where the thumb THUMB and the index finger IF are in contact with or close to the object to be grasped OBJ. While FIG. 11 depicts only the joints of two fingers for convenience of drawing, the middle finger MF, the ring finger RF and the little finger LF also have the same joints as the index finger IF and face the object to be grasped OBJ.

The thumb THUMB is provided with the interphalangeal joint IP, the metacarpophalangeal joint MP and the first carpometacarpal joint CMX. On the curved surface portions (arc-shaped portions) of the interphalangeal joint IP, the metacarpophalangeal joint MP and the first carpometacarpal joint CMX, the extensor tendon 324 and the flex tendon 334 are suspended, and are extended from the proximal side toward the distal side, that is, from the first carpometacarpal joint CMX toward the interphalangeal joint IP. One ends of the extensor tendon 324 and the flex tendon 334 are connected to one ends of the artificial muscles 422 and 432, respectively, and the other ends of the artificial muscles 422 and 432 are provided with the air supply nozzles/suction nozzles 530. The air supply nozzles/suction nozzles 530 of the artificial muscles 422 and 432 are connected to the sides of the solenoid valves 622 and 632, respectively.

The thumb THUMB is further provided with the second carpometacarpal joint CMY. The second carpometacarpal joint CMY controls the operations of the abductor 412 and the adductor 442 of the thumb THUMB. On the second carpometacarpal joint CMY, the abductor tendon 314 and the adductor tendon 344 are suspended. One ends of the abductor tendon 314 and the adductor tendon 344 are connected to one ends of the artificial muscles 412 and 442, and the other ends of the artificial muscles 412 and 442 are provided with the air supply nozzles/suction nozzles 530. The air supply nozzles/suction nozzles 530 are connected to the sides of the solenoid valves 612 and 642, respectively.

The index finger IF is provided with the distal interphalangeal joint DIP, the proximal interphalangeal joint PIP, the metacarpophalangeal joint MP and the carpometacarpal joint CM. On the curved surface portions (arc-shaped portions) of these joints, the extensor tendon 300A and the flex tendon 300B are suspended, and are extended from the proximal side toward the distal side, that is, from the carpometacarpal joint CM toward the distal interphalangeal joint DIP. One ends of the extensor tendon 300A and the flex tendon 300B are connected to one ends of the extensor 400A and the flexor 400B, respectively, and the other ends of the extensor 400A and the flexor 400B are connected to one ends of the air supply nozzles/suction nozzles 530. The other ends of the air supply nozzles/suction nozzles 530 are connected to the sides of the solenoid valves 652 and 662.

While FIG. 11 illustrates the index finger IF for convenience of drawing and explanation, descriptions of the middle finger MF, the ring finger RF and the little finger LF are omitted since they have substantially similar structures as the index finger IF.

Now, by using as an example the solenoid valves 622 and 632 that drive the side of the thumb THUMB, the sharing, workings and the like of the operations thereof will be described. The solenoid valve 622 is formed of two valves of a solenoid valve I and a solenoid valve II. The solenoid valve I acts to pressurize the artificial muscle 442 so that the artificial muscle 442 expands in the direction of the width. When the artificial muscle 442 expands in the direction of the width, the extensor tendon 324 is pulled in the direction of the length of the artificial muscle 442. The valve function of the solenoid valve I providing such workings will be referred to as "extensor pressurization" in the present specification.

The solenoid valve II acts to depressurize the artificial muscle 442 so that the artificial muscle 442 flexes in the direction of the width and extends in the direction of the length. When the artificial muscle 442 extends in the direction of the length, the extensor tendon 324 moves toward the first carpometacarpal joint CMX. The valve function of the solenoid valve II providing such workings will be referred to as "extensor depressurization" in the present specification.

A solenoid valve III acts to pressurize the artificial muscle 432 so that the artificial muscle 432 expands in the direction of the width. When the artificial muscle 432 expands in the direction of the width, the flex tendon 334 is pulled in the direction of the length of the artificial muscle 432. The solenoid valve III providing such workings will be referred to as "flexor pressurization" in the present specification.

A solenoid valve IV acts to depressurize the artificial muscle 432 so that the artificial muscle 432 is flexed in the direction of the width and extended in the direction of the length. When the artificial muscle 432 is extended in the direction of the length, the flex tendon 334 moves toward the first carpometacarpal joint CMX. The solenoid valve IV providing such workings will be referred to as "flexor depressurization" in the present specification.

As is apparent from the description given above, in the robot hand 1000 according to the present embodiment, since the four solenoid valves I to IV are used to control the extensor tendon 324 and the flex tendon 334 in rotating the joints of the thumb THUMB, sixteen different control states can be created by combinations of ON and OFF of the solenoid valves I to IV. Moreover, the same applies to the other fingers; the extensor tendon 300A and the flex tendon 300B can be controlled by using four solenoid valves, and sixteen different control states can be created for each finger by combinations of ON and OFF of the solenoid valves I to IV.

FIG. 12 is an explanatory view explaining the control states of the solenoid valves I to IV. FIG. 12 depicts the relationship among the ON and OFF operations of the solenoid valves I, II, III and IV depicted in FIG. 11, the valve functions of the valves, and the operations of the finger mechanism portion 100.

The valve function of the solenoid valve I includes the "extensor pressurization". The "extensor pressurization" is an operation to pressurize 400A and 422 by supplying air thereto to expand them in the direction of the width so that the extensor tendons 300A and 324 are pulled toward the artificial muscles 400A and 422.

The valve function of the solenoid valve II includes the "extensor depressurization". The "extensor depressurization" is an operation to depressurize the artificial muscles 400A and 422 to flex them in the direction of the width and extend them in the direction of the length, that is, to relax the extensor tendons 300A and 324 toward the metacarpophalangeal joint MP.

The valve function of the solenoid valve III includes the "flexor pressurization". The "flexor pressurization" is an operation to pressurize the artificial muscles 400B and 432 by supplying air thereto to expand them in the direction of the width and flex them in the direction of the length so that the flex tendons 300B and 334 are pulled toward the artificial muscles 400A and 432.

The valve function of the solenoid valve IV includes the "flexor depressurization". The "flexor depressurization" is an operation to depressurize the artificial muscles 400B and 432 to flex them in the direction of the width and extend them in the direction of the length, that is, to relax the flex tendons 300B and 332 toward the metacarpophalangeal joint MP.

Sixteen different valve states (control states) are prepared by combinations of ON and OFF of the solenoid valves I to IV. The valve state 0 indicates that the four valves of the solenoid valves I to IV are all OFF. In the valve state 0, the extensor tendon 300A and the flex tendon 300B (the extensor tendon 324 and the flex tendon 334) are placed in a state of being antagonistic to each other.

The valve state 1 is a control state where only the solenoid valve IV is ON and the remaining three solenoid valves are OFF.

The valve state 2 is a control state where only the solenoid valve III is ON and the remaining three solenoid valves I, II and IV are OFF. The valve state 2 is used when so-called "additional tightening of the object" is performed in which by expanding the artificial muscles 400B and 432 in the direction of the width, the flex tendons 300B and 334 are pulled toward the artificial muscles 400B and 432 to increase the strength of contact between the joints and the object to be grasped OBJ.

In the valve state 3, the solenoid valves I and II are OFF and the solenoid valves III and IV are ON. In the valve state 3, the flexor pressurization and the flexor depressurization can be used in combination. By combining these two pressures and the control time, a transient control that cannot be expected of the normal control can be realized.

The valve state 4 is a control state where only the solenoid valve II is ON and the remaining three solenoid valves I, III and IV are OFF.

In the valve state 5, the solenoid valves II and IV are ON and the solenoid valves I and III are OFF. The valve state 5 is adopted when so-called finger pulling to separate the fingers from the object to be grasped OBJ with which they are in contact is performed. The artificial muscles 400 are relaxed by simultaneously performing extensor depressurization and flexor depressurization, and unnecessary forces applied to the joints and the tendons 300 are precluded to thereby prevent deterioration thereof.

In the valve state 6, the solenoid valves II and III are ON and the solenoid valves I and IV are OFF. The valve state 6 is adopted when the object to be grasped OBJ is grasped. A preferred finger attitude when the object to be grasped OBJ is grasped is a condition where the force on the palm side that is in contact with the object to be grasped OBJ is increased and the force on the back side of the hand is relaxed. Therefore, the extensors 400A and 422 are depressurized and the flexors 400B and 432 are pressurized.

In the valve state 7, the solenoid valve I is OFF and the remaining solenoid valves II to IV are all ON. In the valve state 7, the states of the solenoid valves III and IV are the same as those of the valve state 3 and are both ON.

In the valve state 8, the solenoid valve I is ON and the remaining solenoid valves are all OFF. In the valve state 8, the ON and OFF states of the solenoid valves are reverse to those of the valve state 7. In the valve state 8, the extensors 400A and 422 (the extensor tendons 300A and 324) are extended, and the joints are aligned substantially in a straight line. By controlling to the valve state 8, pressurization to the object to be grasped OBJ is released.

In the valve state 9, the solenoid valves I and IV are ON and the solenoid valves II and III are OFF. In the valve state 9, the extensors 400A and 422 (the extensor tendons 300A and 324) are extended and the flexors 400B and 432 (the flex tendons 300B and 334) are relaxed, which is a state most suitable for releasing the fingers from the object to be grasped OBJ.

In the valve state 10, the solenoid valves I and III are ON and the solenoid valves II and IV are OFF. In the valve state 10, the extensors 400A and 422 (the extensor tendons 300A and 324) and the flexors 400B and 432 (the flex tendons 300B and 334) are both extended, and the extensors 400A and 422 (the extensor tendons 300A and 324) and the flexors 400B and 432 (the flex tendons 300B and 334) are placed in a state of being antagonistic to each other. This state is adopted when the initial states of the artificial muscles 400 are checked and when the joints are tightened, that is, the flexibility of the joints are decreased.

The robot hand 1000 may adopt the states depicted in the valve states 11 to 15 by combinations of the solenoid valves I to IV. For example, by controlling to the valve state 11 and combinations of depressurization magnitudes and depressurization times, various changes can be provided to the operations of the flexors 400 and 432.

In the valve states 12 to 14, since pressurization and depressurization of the extensors 400A and 422 (the extensor tendons 300A and 324) can be simultaneously made ON, various changes can be provided to the operations of the extensors 400A and 422 by combinations of pressurization magnitudes and pressurization times and further, depressurization magnitudes and depressurization times.

In the valve state 15, since not only pressurization and depressurization of the extensors 400A and 422 (the extensor tendons 300A and 324) can be simultaneously made ON but also pressurization and depressurization of the flexors 400B and 432 (the flex tendons 300B and 334) can be simultaneously made ON, the operations of the extensors 400A and 422 and the flexors 400B and 432 can be used in combination. In the control of the finger mechanism according to the present embodiment, a feature of being capable of performing a wide variety of operations on the fingers is obtained by rotating the joints by using the four solenoid valves I to IV and the two artificial muscles 400A and 400B (or 422 and 432) for one finger. For the thumb THUMB, since the two solenoid valves 612 and 642 are used to perform operation control also for the operation control of the abductor 412 and the adductor 442, a feature of being capable of behaving similarly to human fingers and hand is obtained.

Hereinafter, a method for controlling the robot hand 1000 will be described.

Figure 13:
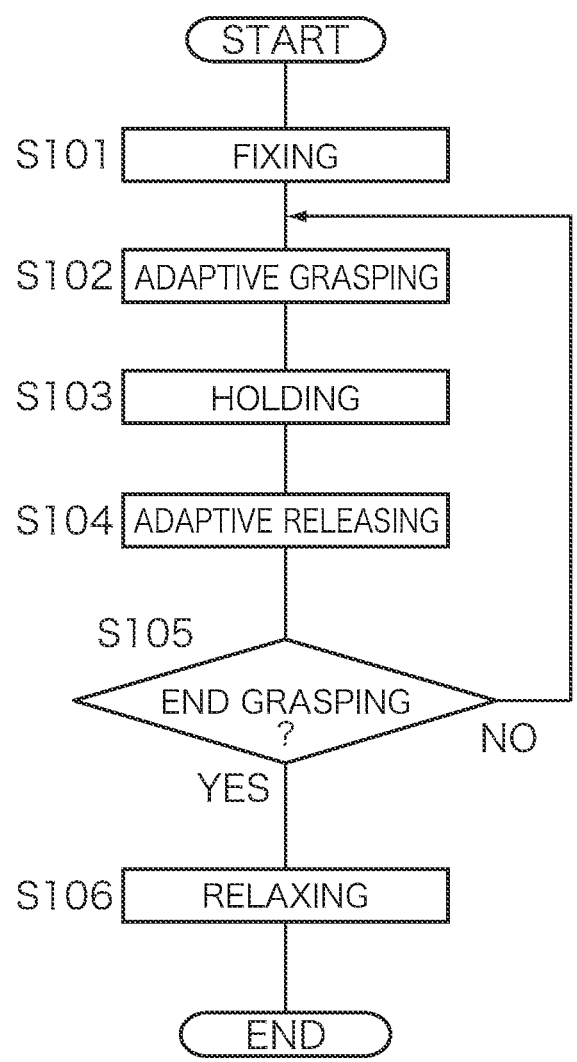
FIG. 13 is a flowchart explaining the method for controlling the robot hand according to the first embodiment.

FIG. 13 is a flowchart explaining the method for controlling the robot hand 1000 according to the first embodiment. When an operation instruction related to the start of grasping is accepted from the controller CON, the CPU 701 mounted on the control board 700 that the robot hand 1000 is provided with executes fixing control (step S101). Here, the fixing control is to place the traction force of the extensor tendon 300A and the traction force of the flex tendon 300B in an initial state where they are antagonistic to each other. Specifically, the CPU 701 controls ON and OFF of the solenoid valves I to IV into the above-described valve state 10, and controls the extensor 400A and the flexor 400B both into pressurized state. The extensor 400A and the flexor 400B both expand in the direction of the width and flex in the direction of the length to thereby pull the extensor tendon 300A and the flex tendon 300B so that the traction forces thereof are antagonistic to each other. The same applies to the extensor 422 and the flexor 432 that the thumb THUMB is provided with.

Then, the CPU 701 shifts the control state of the finger mechanism portion 100 to adaptive grasping (step S102). The adaptive grasping is an operation to place the fingers of the finger mechanism portion 100 along the object to be grasped OBJ according to the shape of the object to be grasped OBJ and make the robot hand 1000 start to grasp the object to be grasped OBJ. Specifically, the CPU 701 controls ON and OFF of the solenoid valves I to IV into the above-described valve state 6, and controls the extensor 400A into depressurized state and the flexor 400B into pressurized state. Weakening of the tension of the extensor tendon 300A enables control to place the fingers of the finger mechanism portion 100 along the object to be grasped OBJ. The same applies to the extensor 422 and the flexor 432 that the thumb THUMB is provided with. The shift from the fixing control at step S101 to the adaptive grasping at step S102 may be executed on receipt of an operation instruction from the controller CON, or may be automatically executed after a set time has elapsed from the shift to the fixing control.

Then, the CPU 701 shifts the control state of the finger mechanism portion 100 to holding (step S103). The holding is an operation to hold the object to be grasped OBJ grasped by the robot hand 1000. Specifically, the CPU 701 controls ON and OFF of the solenoid valves I to IV into the above-described valve state 0, and controls the tensions of the extensor tendon 300A and the flex tendon 300B to a state where they are held. The same applies to the extensor tendon 324 and the flex tendon 334 that the thumb THUMB is provided with. The shift from the adaptive grasping at step S102 to the holding at step S103 may be executed on receipt of an operation instruction from the controller CON, or may be automatically executed after a set time has elapsed from the shift to the adaptive grasping.

When an operation instruction to provide an instruction to release the grasping operation is accepted from the controller CON, the CPU 701 controls the control state of the finger mechanism portion 100 to adaptive releasing (step S104). The adaptive releasing is an operation for releasing the holding operation at step S103. The CPU 701 controls ON and OFF of the solenoid valves I to IV into the above-described valve state 9, and controls the extensor 400A into pressurized state and the flexor 400B into depressurized state. By increasing the tension of the extensor tendon 300A and decreasing the tension of the flex tendon 300B, the holding operation can be released. The same applies to the extensor 422 and the flexor 432 that the thumb THUMB is provided with.

Then, the CPU 701 determines whether to end the grasping or not (step S105). When an operation instruction related to the grasping end instruction is accepted from the controller CON, the CPU 701 determines to end the grasping. When determining not to end the grasping (S105: NO), the CPU 701 returns the process to step S102, and executes the series of processing from steps S102 to S104 to grasp another object to be grasped OBJ.

On the other hand, when determining to end the grasping (S105: YES), the CPU 701 controls the control state of the finger mechanism portion 100 to relaxing (step S106). The relaxing is an operation for finger pulling to avoid contact of the finger mechanism portion 100 with the object to be grasped OBJ and a box, a container or the like accommodating the object to be grasped OBJ and for protecting the tendons 300 and the artificial muscles 400. The CPU 701 controls ON and OFF of the solenoid valves I to IV into the above-mentioned valve state 5, and controls the extensor 400A and the flexor 400B both into depressurized state. The same applies to the extensor 422 and the flexor 432 that the thumb THUMB is provided with.

While control to any of the valve states 0 to 16 is performed in the present embodiment, a structure may be adopted in which two valve states are alternately switched at time intervals. By switching the states of the extensor pressurization, the extensor depressurization, the flexor pressurization and the flexor depressurization at time intervals, a transient control that cannot be expected of the normal control can be realized.

As described above, in the first embodiment, since the rotation cores 11 to 13 are rotated by the tensions of the extensor tendon 300A and the flex tendon 300B and the rotation is autonomously stopped under a condition where the tensions of the extensor tendon 300A and the flex tendon 300B are balanced with each other, a soft object having an indefinite shape can be grasped without being crushed.

Moreover, in the first embodiment, the tension can be uniquely determined according to the physical characteristics of the extensor tendon 300A and the flex tendon 300B.

Further, in the present embodiment, since the contact length with the extensor tendon 300A and the flex tendon 300B is longer in the order of the rotation cores 11, 12 and 13, when the object to be grasped OBJ is grasped, a finger form to enfold the object to be grasped OBJ (grasping form) can be created after the finger joints are widened, even if the object to be grasped OBJ is a soft object having an indefinite shape, it can be grasped appropriately.

Second Embodiment

In a second embodiment, a structure will be described where feedback control is performed based on the outputs of the angle sensor and the force sensor that the finger mechanism portion 100 is provided with.

Figure 14:
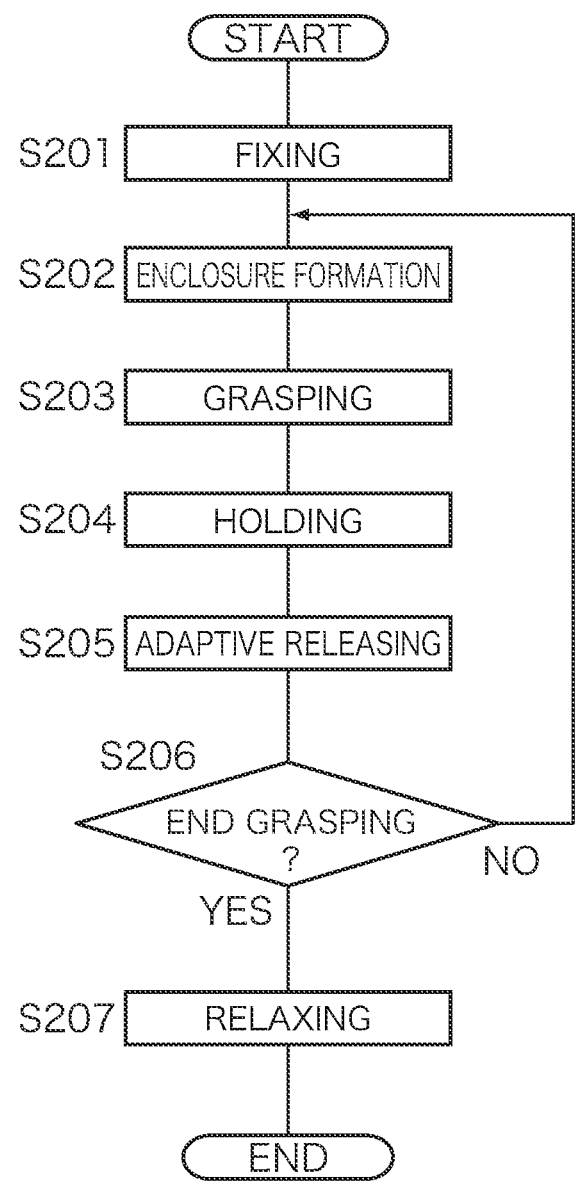
FIG. 14 is a flowchart explaining the control procedure of the robot hand according to the second embodiment.

FIG. 14 is a flowchart explaining the control procedure of the robot hand 1000 according to the second embodiment. When an operation instruction related to the start of grasping is accepted from the controller CON, the CPU 701 mounted on the control board 700 that the robot hand 1000 is provided with executes the fixing control (step S201). Here, the fixing control is to place the traction force of the extensor tendon 300A and the traction force of the flex tendon 300B in an initial state where they are antagonistic to each other. Specifically, the CPU 701 controls ON and OFF of the solenoid valves I to IV into the above-described valve state 10, and controls the extensor 400A and the flexor 400B both into pressurized state. The extensor 400A and the flexor 400B both expand in the direction of the width and flex in the direction of the length to thereby pull the extensor tendon 300A and the flex tendon 300B so that the traction forces thereof are antagonistic to each other. The same applies to the extensor 422 and the flexor 432 that the thumb THUMB is provided with.

Then, the CPU 701 shifts the control state of the finger mechanism portion 100 to enclosure formation (step S202).

The enclosure formation is to determine the permissible range and the permissible region of the operation when the robot hand 1000 is mounted on the robot ROB and the object to be grasped OBJ is grasped and released. The robot hand 1000 is required to behave according to the size and shape of the object to be grasped OBJ, the condition of the surroundings where the object to be grasped OBJ is placed and the condition of the surroundings where the object to be grasped OBJ is accommodated. For example, when a peach is placed into a box or when a peach is taken out from a box, since it is necessary that the angle of the finger mechanism be different between the end and the middle of the box, the enclosure formation is set in view of such a situation. The control procedure in the enclosure formation will be described in detail with reference to the flowchart depicted in FIG. 15.

Then, the CPU 701 shifts the control state of the finger mechanism portion 100 to grasping (step S203). The grasping is substantially the same operation as the adaptive grasping described in the first embodiment, and is an operation to place the fingers of the finger mechanism portion 100 along the object to be grasped OBJ according to the shape of the object to be grasped OBJ and make the robot hand 1000 start to grasp the object to be grasped OBJ. The control procedure in the grasping will be described in detail with reference to the flowchart depicted in FIG. 16.

Then, the CPU 701 shifts the control state of the finger mechanism portion 100 to the holding (step S204). The holding is an operation to hold the object to be grasped OBJ grasped by the robot hand 1000. Specifically, the CPU 701 controls ON and OFF of the solenoid valves I to IV into the above-described valve state 0, and controls the tensions of the extensor tendon 300A and the flex tendon 300B to a state where they are held. The shift from the grasping at step S203 to the holding at step S204 may be executed on receipt of an operation instruction from the controller CON, or may be automatically executed after a set time has elapsed from the shift to the grasping state.

When an operation instruction to provide an instruction to release the grasping operation is accepted from the controller CON, the CPU 701 controls the control state of the finger mechanism portion 100 to the adaptive releasing (step S205). The adaptive releasing is an operation for releasing the holding operation at step S204. The CPU 701 controls ON and OFF of the solenoid valves I to IV into the above-described valve state 9, and controls the extensor 400A into pressurized state and the flexor 400B into depressurized state. By increasing the tension of the extensor tendon 300A and decreasing the tension of the flex tendon 300B, the holding operation can be released. The same applies to the extensor 422 and the flexor 432 that the thumb THUMB is provided with.

Then, the CPU 701 determines whether to end the grasping or not (step S206). When an operation instruction related to the grasping end instruction is accepted from the controller CON, the CPU 701 determines to end the grasping. When determining not to end the grasping (S105: NO), the CPU 701 returns the process to step S202, and executes the series of processing from steps S202 to S205 to grasp another object to be grasped OBJ.

On the other hand, when determining to end the grasping (S206: YES), the CPU 701 controls the control state of the finger mechanism portion 100 to the relaxing (step S207). The relaxing is an operation for finger pulling to avoid contact of the finger mechanism portion 100 with the object to be grasped OBJ and a box, a container or the like accommodating the object to be grasped OBJ and for protecting the tendons 300 and the artificial muscles 400. The CPU 701 controls ON and OFF of the solenoid valves I to IV into the above-mentioned valve state 5, and controls the extensor 400A and the flexor 400B both into depressurized state. The same applies to the extensor 422 and the flexor 432 that the thumb THUMB is provided with.

Figure 15:
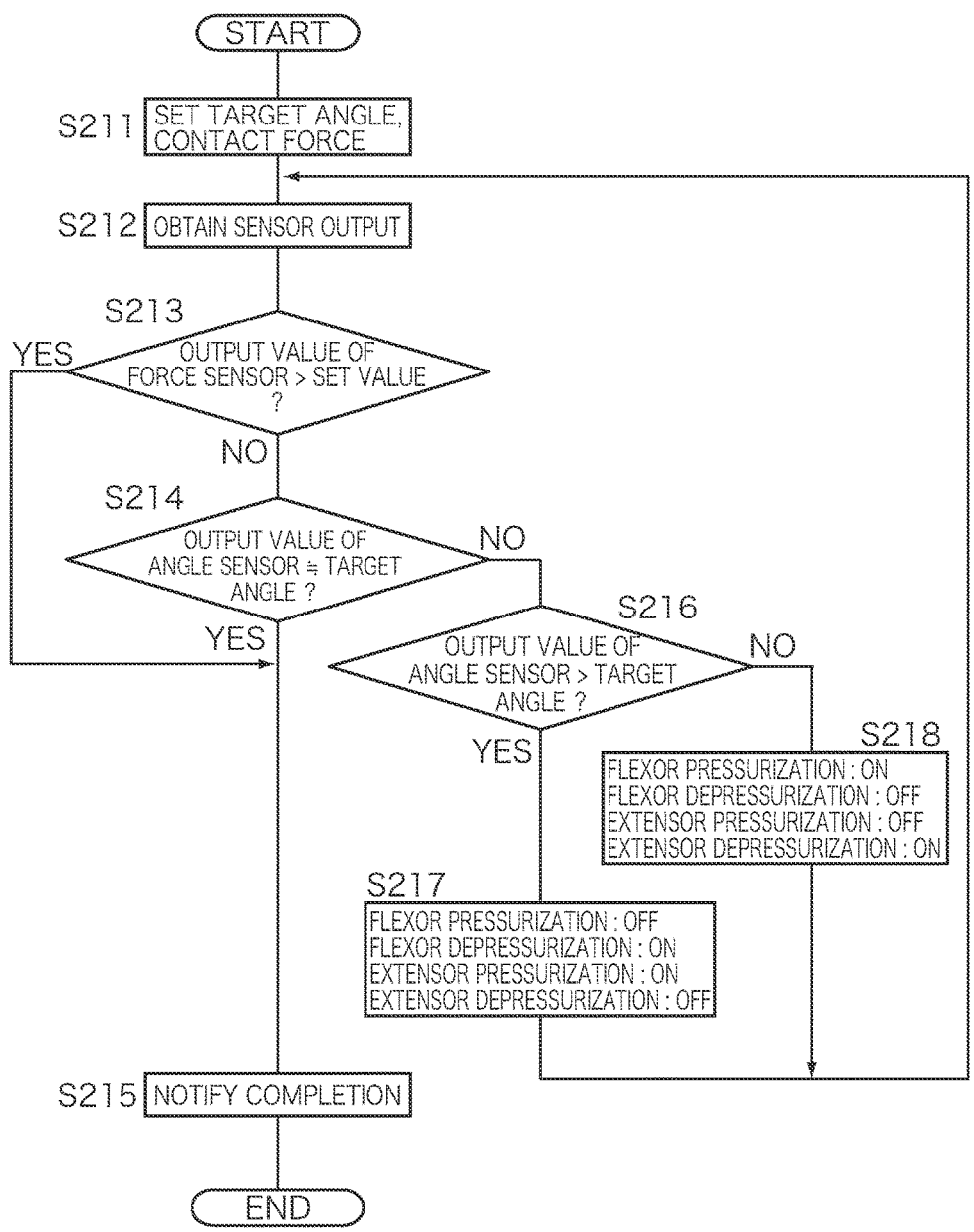
FIG. 15 is a flowchart depicting the control procedure of the enclosure formation.

FIG. 15 is a flowchart depicting the control procedure of the enclosure formation. The CPU 701 mounted on the control board 700 that the robot hand 1000 is provided with accepts the target angle for a joint angle and the set value of the contact force through the controller CON (step S211).

When a sensor output from each sensor is obtained (step S212), the CPU 701 determines whether the sensor value of the force sensor 160 is higher than the set value or not (step S213). When the sensor value of the force sensor 160 is higher than the set value (S213: YES), the CPU 701 notifies the controller CON of completion (step S215), and ends the processing according to this flowchart.

When determining that the sensor value of the force sensor 160 is not more than the set value (S213: NO), the CPU 701 determines whether the joint angle measured by the angle sensor 170 is substantially equal to the target angle or not (step S214). When determining that the joint angle measured by the angle sensor 170 is substantially equal to the target angle (S214: YES), the CPU 701 provides a notification of completion at step S215 and ends the processing according to this flowchart.

When determining that the joint angle indicated by the sensor value of the angle sensor 170 is substantially different from the target angle (step S214: NO), the CPU 701 determines whether the joint angle measured by the angle sensor 170 is larger than the target angle or not (step S216).

When determining that the joint angle measured by the angle sensor 170 is larger than the target angle (S216: YES), the CPU 701 controls ON and OFF of the solenoid valves I to IV, and controls the flexors 400B and 432 into depressurized state and the extensors 400A and 422 into pressurized state (step S217). The processing of step S217 corresponds to the valve state 9 of FIG. 12, and corresponds to the operation of the adaptive releasing. That is, that the angle sensor value is higher than the target value indicates that the distance between facing bones is smaller than the target value; therefore, control is performed in a direction that increases the distance a little. After controlling to the above-mentioned control state, the CPU 701 returns the process to step S212.

On the other hand, when determining that the joint angle measured by the angle sensor 170 is not more than the target angle (S216: NO), the CPU 701 controls ON and OFF of the solenoid valves I to IV, and controls the flexors 400B and 432 into pressurized state and the extensors 400A and 422 into depressurized state (step S218). Step S218 corresponds to the valve state 6 of FIG. 12, and corresponds the operation of the "adaptive grasping". That is, that the angle sensor value is lower than the target value indicates that the distance between facing bones is larger than the target value; therefore, control is performed in a direction that decreases the distance a little. After controlling to the above-mentioned control state, the CPU 701 returns the process to step S212.

Figure 16:
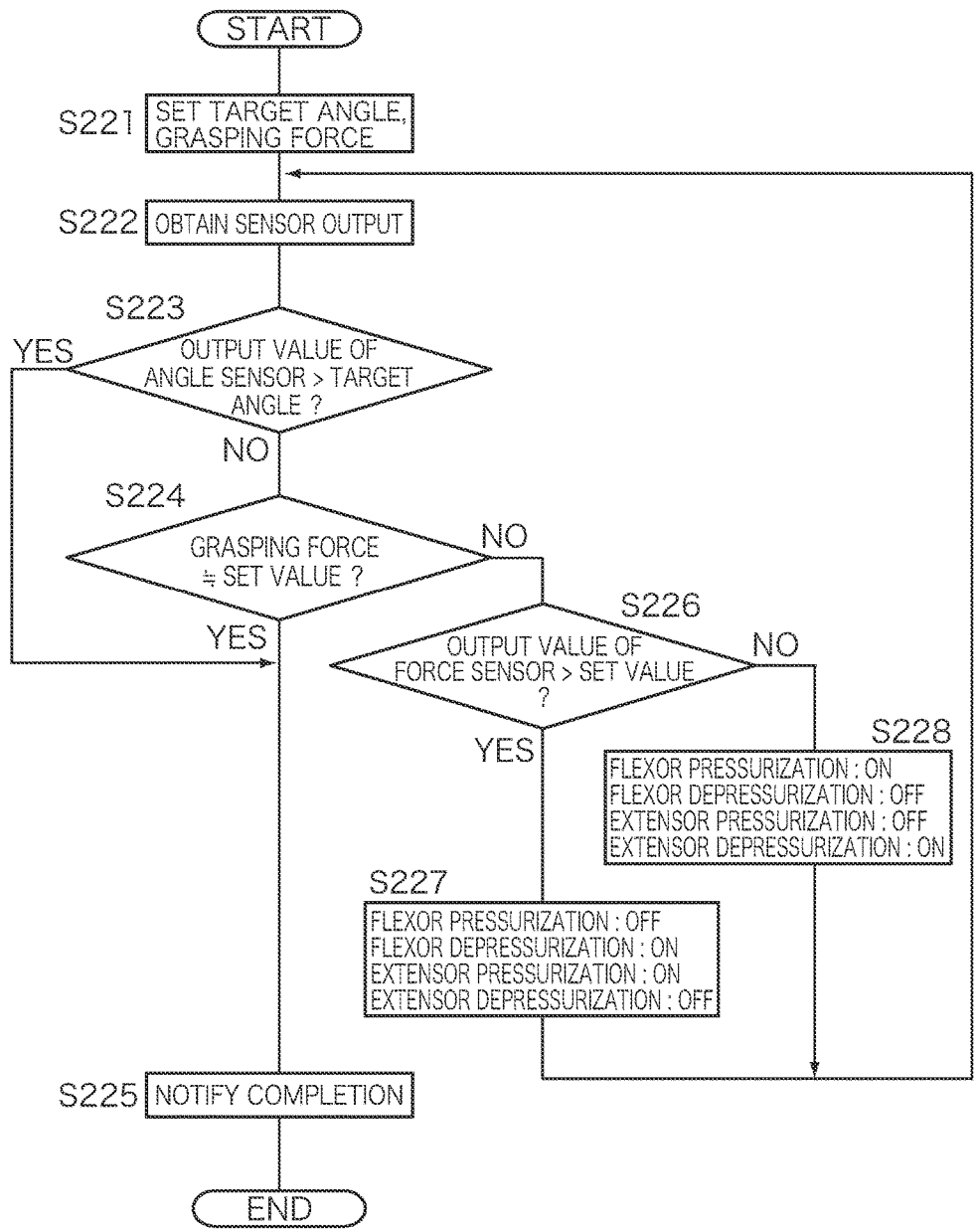
FIG. 16 is a flowchart depicting the control procedure of the grasping operation.

FIG. 16 is a flowchart depicting the control procedure of the grasping operation. The CPU 701 mounted on the control board 700 that the robot hand 1000 is provided with accepts the target angle for a joint angle and the set value of the grasping force through the controller CON (step S221).

When a sensor output from each sensor is obtained (step S222), the CPU 701 determines whether the joint angle measured by the angle sensor 170 is larger than the target angle or not (step S223). When determining that the joint angle measured by the angle sensor 170 is larger than the target angle (S223: YES), the CPU 701 notifies the controller CON of completion (step S225), and ends the processing according to this flowchart.

When determining that the joint angle measured by the angle sensor 170 is not more than the target angle (S223: NO), the CPU 701 determines whether the sensor value of the force sensor 160 (that is, the grasping force) is substantially equal to the set value or not (step S224). When determining that the sensor value of the force sensor 160 is substantially equal to the target angle (S214: YES), the CPU 701 provides a notification of completion at step S225 and ends the processing according to this flowchart.

When determining that the sensor value of the force sensor 160 is substantially different from the set value (step S224: NO), the CPU 701 determines whether the sensor value of the force sensor 160 is higher than the set value or not (step S226). When the sensor value of the force sensor 160 is higher than the set value (S226: YES), the CPU 701 controls ON and OFF of the solenoid valves I to IV, and controls the flexors 400B and 432 into depressurized state and the extensors 400A and 422 into pressurized state (step S227). Step S227 corresponds to the valve state 9 of FIG. 12, and corresponds to the operation of the adaptive releasing. That is, that the force sensor value is higher than the target value indicates that the grasping force is large; therefore, control is performed in a direction that decreases the grasping force. After controlling to the above-mentioned control state, the CPU 701 returns the process to step S222.

When determining that the sensor value of the force sensor 160 is not more than the set value (S226: NO), the CPU 701 controls ON and OFF of the solenoid valves I to IV, and controls the flexors 400B and 432 into pressurized state and the extensors 400A and 422 into depressurized state (step S228). Step S228 corresponds to the valve state 6 of FIG. 12, and is equal to the operation of the adaptive grasping. That is, that the force sensor value is lower than the target value indicates that the grasping force is weak; therefore, control is performed in a direction that increases the grasping force. After controlling to the above-mentioned control state, the CPU 701 returns the process to step S222.

As described above, in the second embodiment, since feedback control can be executed based on the sensor outputs of the force sensor 160 and the angle sensor 170, compliance control to autonomously control the grasping form to grasp the object to be grasped OBJ, the holding force, the flexibility of finger joint and the like is enabled.

The embodiments disclosed herein should be considered as illustrative in all respects and not restrictive. The scope of the present invention is defined not by the definition given above but by the claims, and all changes that fall within the definition and scope equivalent to the claims are to be embraced.

What is claimed is:

1. A finger mechanism comprising:
   a first bone member and a second bone member;
   a first rotation core that rotatably couples the first bone member and the second bone member at end portions in a direction of a length thereof;
   an extensor tendon that is disposed on a side where the second bone member extends with respect to the first bone member and extends in the direction of the length of the first bone member and the second bone member;
   a first extensor tendon guide that is provided on both of the first bone member and the second bone member and guides the extensor tendon so that the extensor tendon is in contact with a part of a surface of the first rotation core;
   an extensor that is connected to the extensor tendon and extends and flexes the extensor tendon;
   a flex tendon that is disposed on a side where the first bone member flexes with respect to the second bone member and extends in the direction of the length of the first bone member and the second bone member;
   a first flex tendon guide that is provided on both of the first bone member and the second bone member and guides the flex tendon so that the flex tendon is in contact with another part of the surface of the first rotation core; and
   a flexor that is connected to the flex tendon and extends and flexes the flex tendon.

2. The finger mechanism according to claim 1, further comprising:
   a third bone member;
   a second rotation core that rotatably couples an end portion of the third bone member at an end portion of the second bone member on a side opposite to the end portion to which the first bone member is coupled;
   a second extensor tendon guide that is provided on both of the second bone member and the third bone member and guides the extensor tendon so that the extensor tendon is in contact with a part of a surface of the second rotation core; and
   a second flex tendon guide that is provided on both of the second bone member and the third bone member and guides the flex tendon so that the flex tendon is in contact with another part of the surface of the second rotation core.

3. The finger mechanism according to claim 2, further comprising:
   a fourth bone member;
   a third rotation core that rotatably couples an end portion of the fourth bone member at an end portion of the third bone member on a side opposite to the end portion to which the second bone member is coupled;
   a third extensor tendon guide that is provided on at least one of the third bone member and the fourth bone member and guides the extensor tendon so that the extensor tendon is in contact with a part of a surface of the third rotation core; and
   a third flex tendon guide that is provided on at least one of the third bone member and the fourth bone member and guides the flex tendon so that the flex tendon is in contact with another part of the surface of the third rotation core.

4. The finger mechanism according to claim 3, wherein the first bone member, the second bone member, the third bone member and the fourth bone member are a metacarpal bone, a proximal phalanx, a middle phalanx and a distal phalanx, respectively.

5. The finger mechanism according to claim 3, wherein the extensor tendon and the flex tendon are elastic bodies that are extended by traction forces of the extensor and the flexor, respectively, and
   when a cross-sectional area of the extensor tendon and the flex tendon is A, a Young's modulus is E, a free length of the extensor tendon is Le0, extended amounts of the extensor tendon by the first rotation core, the second rotation core and the third rotation core are $Le_{(MP)}$, $Le_{(PIP)}$ and $Le_{(DIP)}$, respectively, a free length of the flex tendon is Lf0, and extended amounts of the flex tendon by the first rotation core, the second rotation core and the third rotation core are $Lf_{(MP)}$, $Lf_{(PIP)}$ and $Lf_{(DIP)}$, respectively, a traction force Fe of the extensor tendon and a traction force Ff of the flex tendon are $$Fe = A \times E \times (Lf_{(MP)} + Lf_{(PIP)} + Lf_{(DIP)}/Lf0, \text{ and}$$

$$Ff = A \times E \times (Le_{(MP)} + Le_{(PIP)} + Le_{(DIP)}/Le0.$$

6. The finger mechanism according to claim 5, wherein when the extensor tendon is extended most, a sum $Le_{(MP)} + Le_{(PIP)} + Le_{(DIP)}$ of the extended amounts of the extensor tendon is maximum and a sum $Lf_{(DIP)} + Lf_{(PIP)} + Lf_{(MP)}$ of the extended amounts of the flex tendon is minimum.

7. The finger mechanism according to claim 5, wherein when the flex tendon is extended most, a sum $Lf_{(DIP)} + Lf_{(PIP)} + Lf_{(MP)}$ of the extended amounts of the flex tendon is maximum and a sum $Le_{(MP)} + Le_{(PIP)} + Le_{(DIP)}$ of the extended amounts of the extensor tendon is minimum.

8. The finger mechanism according to claim 3, wherein contact lengths of the extensor tendon and the flex tendon with respect to the first rotation core, the second rotation core and the third rotation core are longer in the order of the first rotation core, the second rotation core and the third rotation core.

9. The finger mechanism according to claim 3, wherein each of the first rotation core, the second rotation core and the third rotation core includes a convex curved surface portion, and a curvature radius of the curved surface portion is larger in the order of the first rotation core, the second rotation core and the third rotation core.

10. The finger mechanism according to claim 9, wherein the curvature radius of the first rotation core is 10% to 40% larger than the curvature radius of the second rotation core, and the curvature radius of the second rotation core is 10% to 40% larger than the curvature radius of the third rotation core.

11. The finger mechanism according to claim 9, wherein a ratio among the curvature radii of the first rotation core, the second rotation core and the third rotation core is 1.62:1.27:1.

12. The finger mechanism according to claim 3, wherein the n-th rotation core (n is any of 1, 2, and 3) is fixed to the n-th bone member or the (n+1)-th bone member.

13. The finger mechanism according to claim 3, wherein the n-th rotation core (n is any of 1, 2 and 3) is provided separately from the n-th bone member and the (n+1)-th bone member.

14. The finger mechanism according to claim 3, wherein the first to fourth bone members, the first to third extensor tendon guides and the first to third flex tendon guides are made of the same material.

15. The finger mechanism according to claim 14, wherein the first to fourth bone members, the first to third extensor tendon guides and the first to third flex tendon guides are made of an ABS (acrylonitrile butadiene styrene) resin.

16. The finger mechanism according to claim 3, wherein a plurality of fingers are provided, and each of the plurality of fingers includes the first to m-th (m is any of 2, 3 and 4) bone members, the first to (m−1)-th rotation cores, the first to (m−1)-th extensor tendon guides, the first to (m−1)-th flex tendon guides, the extensor tendon, the flex tendon, the extensor and the flexor.

17. The finger mechanism according to claim 16, wherein the plurality of fingers include at least one of an index finger, a middle finger, a ring finger and a little finger.

18. The finger mechanism according to claim 16, wherein the plurality of fingers include a thumb, and the thumb further includes an abductor tendon and an abductor that extends and flexes the abductor tendon, and an adductor tendon and an adductor that extends and flexes the adductor tendon.

19. The finger mechanism according to claim 1, wherein the extensor tendon and the flex tendon are elastic bodies that are extended by traction forces of the extensor and the flexor, respectively, and when a cross-sectional area of the extensor tendon and the flex tendon is A, a Young's modulus is E and a distortion is e, an internal tension F caused in the extensor tendon and the flex tendon is given by $F = A \times E \times e$, and when a free length and a extended amount of the extensor tendon and the flex tendon are L0 and ΔL, respectively, the distortion e is expressed by $e = \Delta L/L0$.

20. The finger mechanism according to claim 1, wherein the extensor tendon and the flex tendon include a core portion and a sheath portion that protects the core portion.

21. The finger mechanism according to claim 20, wherein the core portion is a synthetic resin fiber with a Young's modulus of 0.5 GPa to 2.0 GPa.

22. The finger mechanism according to claim 1, wherein each of the extensor and the flexor includes a Mckibben air-driven actuator.

23. A robot hand comprising:

the finger mechanism according to claim 22;

a pressurizing solenoid valve and a depressurizing solenoid valve provided midway on a supply path to supply compressed air to the Mckibben air-driven actuators that the finger mechanism is provided with; and a control unit that controls opening and closing of the pressurizing solenoid valve and the depressurizing solenoid valve, wherein the control unit controls opening and closing of the pressurizing solenoid valve and the depressurizing solenoid valve and controls degrees of contraction of the extensor and the flexor that the finger mechanism is provided with by adjusting an air pressure in the air-driven actuators.

24. A robot hand controlling method, wherein the robot hand includes: the finger mechanism according to claim 22; a pressurizing solenoid valve and a depressurizing solenoid valve provided midway on a supply path to supply compressed air to the Mckibben air-driven actuators constituting the extensor and the flexor of the finger mechanism; and a control unit that controls opening and closing of the pressurizing solenoid valve and the depressurizing solenoid valve and controls degrees of contraction of the extensor and the flexor, the method comprising:

executing a control of opening and closing of the pressurizing solenoid valve and the depressurizing solenoid valve in order to execute the following operation by the control unit, wherein the operation includes:

a fixing operation to make antagonistic to each other traction forces of the extensor and the flexor that the finger mechanism is provided with before an operation to grasp an object to be grasped;

an adaptive grasping operation to grasp the object to be grasped according to a shape of the object to be grasped;

a holding operation to hold the grasping state;
an adaptive releasing operation to release the holding operation; and
a relaxing operation to relax the extensor and the flexor.

25. The robot hand controlling method according to claim 24, wherein
when the fixing operation is executed, the control unit performs control to open the pressurizing solenoid valve and close the depressurizing solenoid valve for each of the air-driven actuators constituting the extensor and the flexor, respectively.

26. The robot hand controlling method according to claim 24, wherein
when the adaptive grasping operation is executed, the control unit performs control to close the pressurizing solenoid valve and open the depressurizing solenoid valve for the air-driven actuator constituting the extensor and performs control to open the pressurizing solenoid valve and close the depressurizing solenoid valve for the air-driven actuator constituting the flexor.

27. The robot hand controlling method according to claim 24, wherein
when the holding operation is executed, the control unit performs control to close the pressurizing solenoid valve and the depressurizing solenoid valve for each of the air-driven actuators constituting the extensor and the flexor, respectively.

28. The robot hand controlling method according to claim 24, wherein
when the adaptive releasing operation is executed, the control unit performs control to open the pressurizing solenoid valve and close the depressurizing solenoid valve for the air-driven actuator constituting the flexor, and performs control to close the pressurizing solenoid valve and open the depressurizing solenoid valve for the air-driven actuator constituting the flexor.

29. The robot hand controlling method according to claim 24, wherein
when the relaxing operation is executed, the control unit performs control to close the pressurizing solenoid valve and open the depressurizing solenoid valve for each of the air-driven actuators constituting the extensor and the flexor, respectively.

30. The robot hand controlling method according to claim 24, wherein
the robot hand further includes:
a force sensor that detects a force of contact with the object to be grasped; and
an angle sensor that detects a rotation angle of each of the bone members, wherein
the control unit controls opening and closing of the pressurizing solenoid valve and the depressurizing solenoid valve based on outputs of the force sensor and the angle sensor, and controls the degrees of contraction of the extensor and the flexor of the finger mechanism by adjusting an air pressure in the air-driven actuators.

31. The finger mechanism according to claim 1, wherein
each of the extensor and the flexor includes a motor and a pulley, and is an artificial muscle of a type that reels up the extensor tendon and the flex tendon by driving of the motor.

32. The finger mechanism according to claim 1, wherein
each of the extensor and the flexor is an artificial muscle of a linear motion type using a linear motor or a biometal.

33. A robot hand comprising:
the finger mechanism according to claim 1; and
a control unit that controls degrees of contraction of the extensor and the flexor that the finger mechanism is provided with.

* * * * *